(12) United States Patent
Saito

(10) Patent No.: US 8,130,451 B2
(45) Date of Patent: Mar. 6, 2012

(54) ZOOM LENS SYSTEM AND CAMERA INCLUDING THE SAME

(75) Inventor: Shinichiro Saito, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 12/935,536

(22) PCT Filed: Apr. 3, 2009

(86) PCT No.: PCT/JP2009/057305
§ 371 (c)(1),
(2), (4) Date: Sep. 29, 2010

(87) PCT Pub. No.: WO2009/125823
PCT Pub. Date: Oct. 15, 2009

(65) Prior Publication Data
US 2011/0032625 A1      Feb. 10, 2011

(30) Foreign Application Priority Data
Apr. 7, 2008   (JP) .................. 2008-099206

(51) Int. Cl.
*G02B 15/14* (2006.01)
(52) U.S. Cl. ....................... 359/676; 359/683
(58) Field of Classification Search ............ 359/676, 359/683
See application file for complete search history.

(56) References Cited

U.S. PATENT DOCUMENTS

| | | | |
|---|---|---|---|
| 3,912,373 A | 10/1975 | Macher | |
| 5,388,004 A | 2/1995 | Adachi | |
| 5,956,184 A | 9/1999 | Sato | |
| 6,449,433 B2 | 9/2002 | Hagimori et al. | |
| 6,483,648 B1 | 11/2002 | Yamanashi | |
| 6,631,034 B2 | 10/2003 | Yamanashi | |
| 2006/0152816 A1 | 7/2006 | Kuroda et al. | |

FOREIGN PATENT DOCUMENTS

| | | |
|---|---|---|
| JP | 49-066354 A | 6/1974 |
| JP | 05-215967 A | 8/1993 |
| JP | 10-133109 A | 5/1998 |
| JP | 11-084239 A | 3/1999 |
| JP | 2001-091833 A | 4/2001 |
| JP | 2001-330777 A | 11/2001 |
| JP | 2001-350093 A | 12/2001 |
| JP | 2002-365547 A | 12/2002 |
| JP | 2004-240398 A | 8/2004 |

OTHER PUBLICATIONS

International Search Report issued in corresponding application PCT/JP2009/057305, dated May 19, 2009.
Written Opinion issued in corresponding application PCT/JP2009/057305, dated May 19, 2009.

*Primary Examiner* — William Choi
(74) *Attorney, Agent, or Firm* — Rossi, Kimms & McDowell LLP

(57) ABSTRACT

Provided is a zoom lens system including, in order from an object side to an image side: a first lens unit having a positive optical power; a second lens unit having a negative optical power; a third lens unit having a positive optical power; a fourth lens unit having a negative optical power; and a fifth lens unit having a positive optical power. In this zoom lens system, magnification sharing between the fourth lens unit and the fifth lens unit, and a movement amount of the second lens unit as a principal magnification lens unit are set appropriately, so as to realize a high zoom ratio and high optical performance over an entire zoom range.

10 Claims, 20 Drawing Sheets

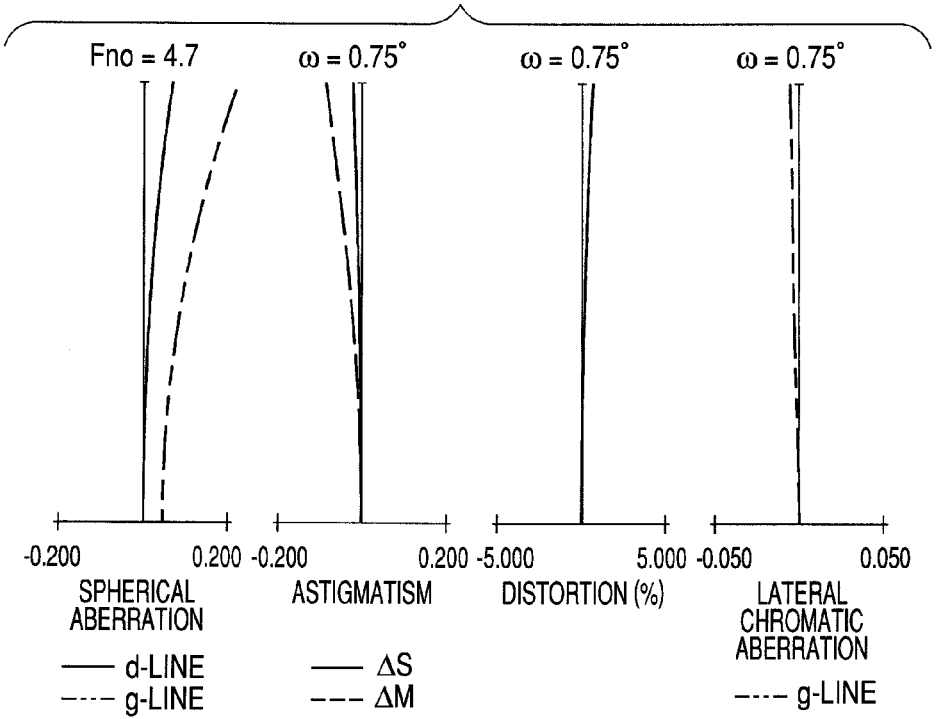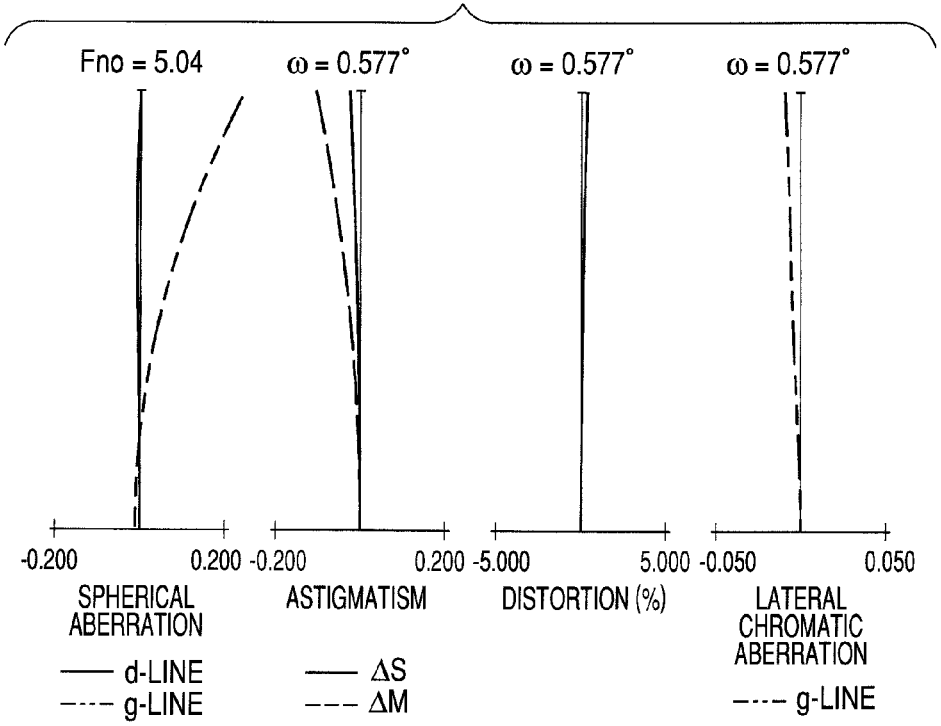

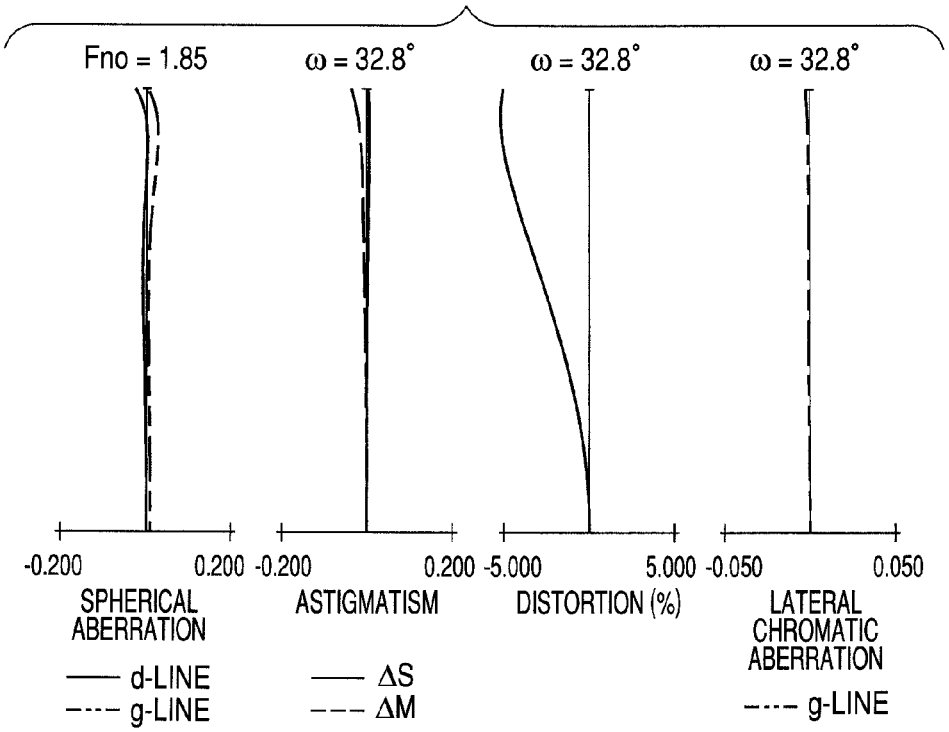
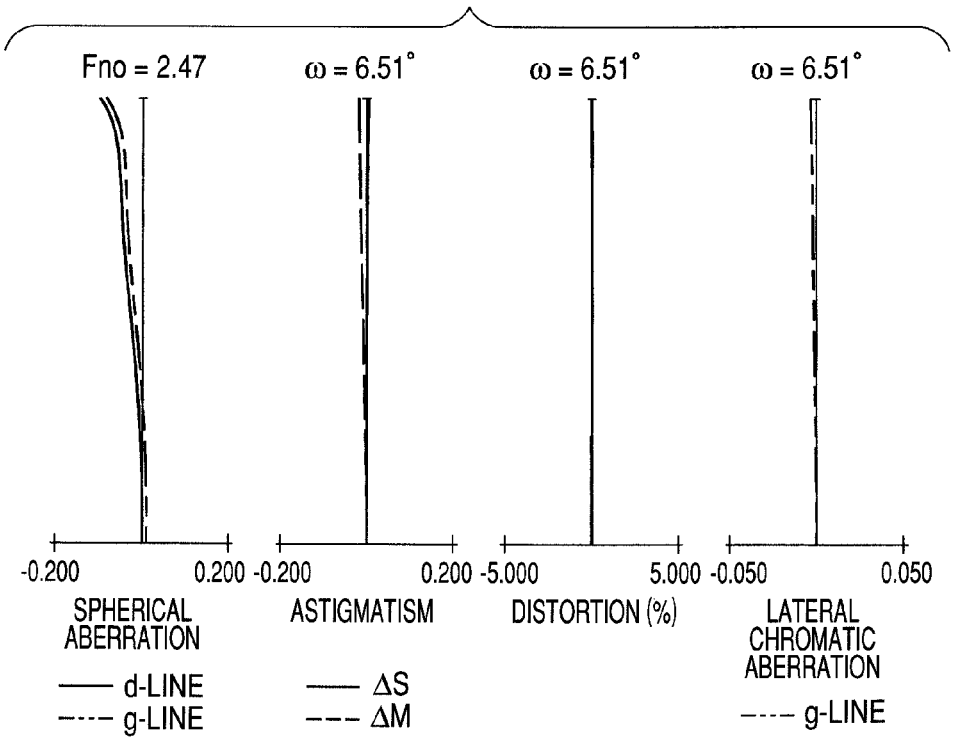

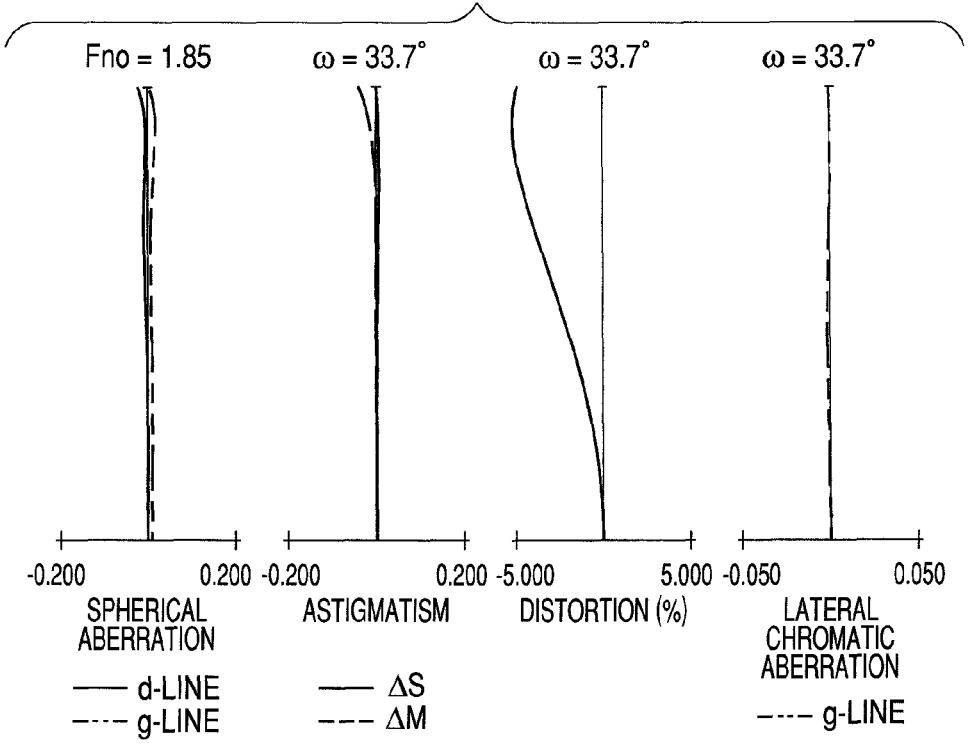
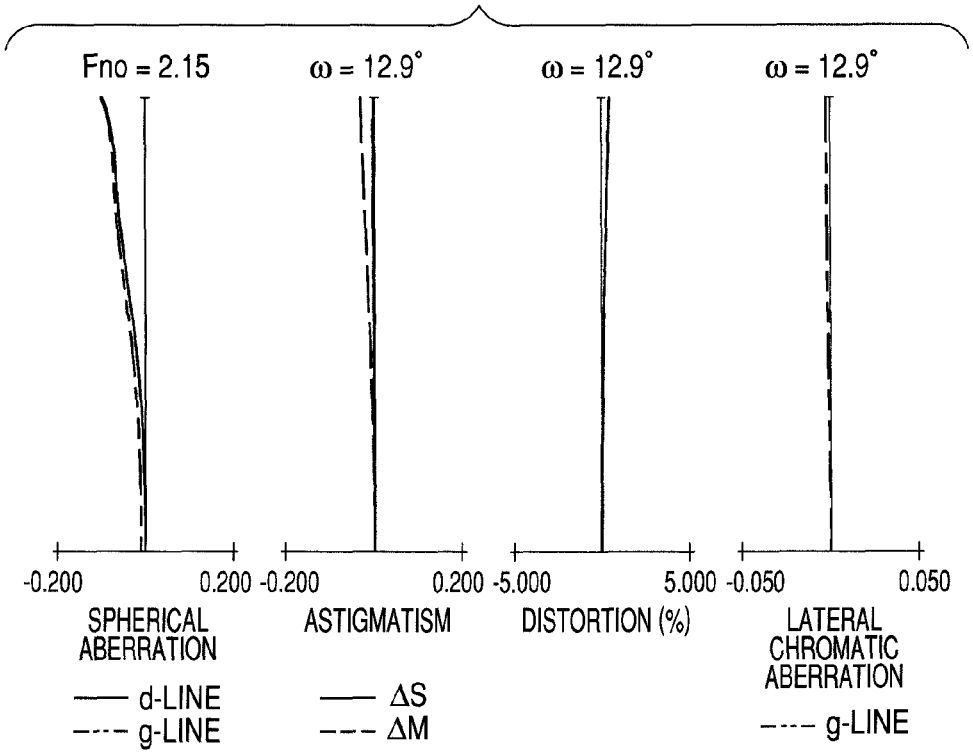

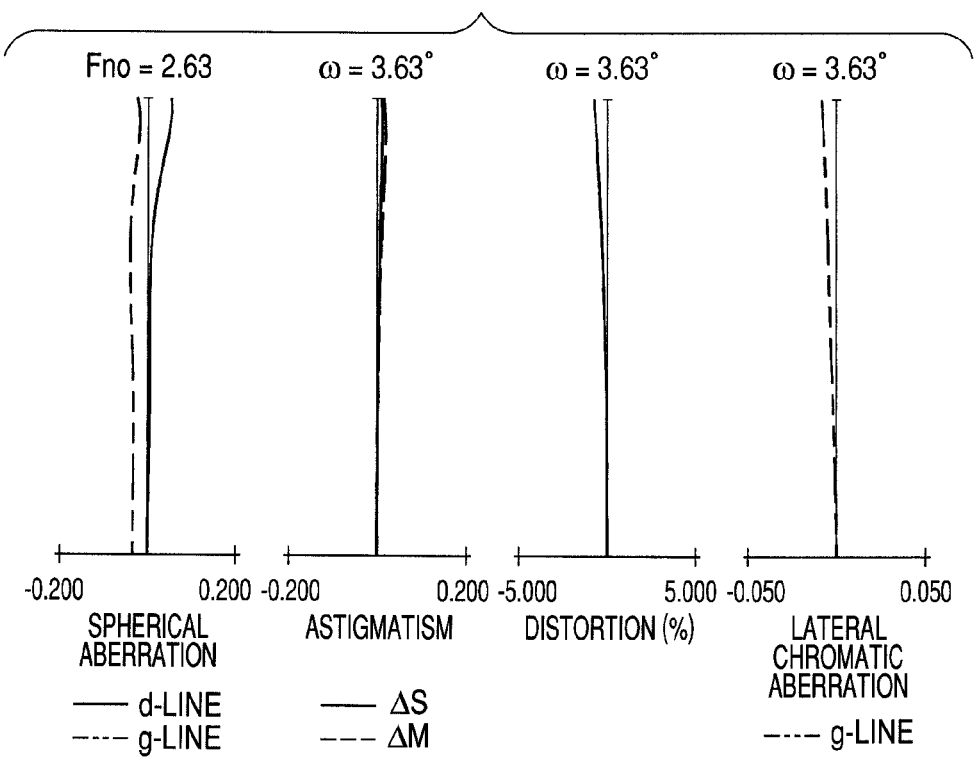
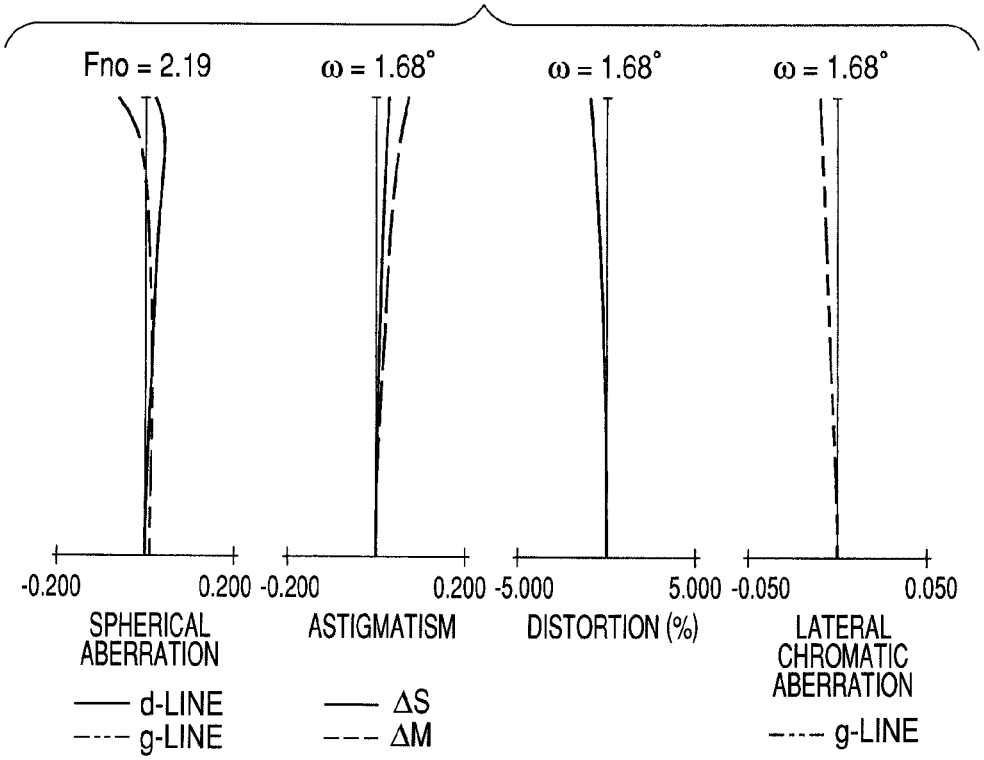

ZOOM LENS SYSTEM AND CAMERA INCLUDING THE SAME

TECHNICAL FIELD

The present invention relates to a zoom lens system and a camera including the same. For instance, the present invention is suitable for a video camera, a digital still camera, a broadcasting camera, a silver-halide film camera, a monitoring camera, and the like.

BACKGROUND ART

A shooting optical system used for a camera such as a video camera or a digital still camera having a solid-state image pickup element (e.g., CCD or CMOS image sensor) is required to be a zoom lens system having a high zoom ratio and high optical performance.

As one of the zoom lens systems that can meet the requirements, there is known a positive lead zoom lens system in which a lens unit having a positive refractive power is disposed at the object side.

The positive lead zoom lens system can be easily adapted to have a high zoom ratio, and hence is often used for a zoom lens system having a zoom ratio of 10 or higher, in particular. For instance, there is known a zoom lens system including five lens units having positive, negative, positive, negative and positive refractive powers in this order from the object side to the image side (see Japanese Patent Application Laid-Open No. 2004-240398 corresponding to U.S. Patent Application No. 2006/0152816, Japanese Patent Application Laid-Open No. H05-215967 (corresponding to U.S. Pat. No. 5,388,004), Japanese Patent Application Laid-Open No. 2001-330777 (corresponding to U.S. Pat. No. 6,631,034), Japanese Patent Application Laid-Open No. 2002-365547, and Japanese Patent Application Laid-Open No. S49-066354 (corresponding to U.S. Pat. No. 3,912,373).

In general, to realize a high zoom ratio in a zoom lens system, a refractive power of the lens unit that changes a total zoom ratio of the entire zoom lens system (hereinafter referred to as a principal magnification lens unit) should be enhanced, or a movement amount of the principal magnification lens unit for zooming should be increased mostly.

However, a high zoom ratio can be realized if the refractive power of the principal magnification lens unit is simply enhanced so as to increase the movement amount, but an aberration variation upon zooming increases so that it becomes difficult to obtain high optical performance over the entire zoom range.

In order to realize a high zoom ratio and to obtain high optical performance over the entire zoom range, it is important to set magnification sharing of individual lens units of the zoom lens system for zooming appropriately and to set the movement amount appropriately.

DISCLOSURE OF THE INVENTION

It is an object of the present invention to provide a zoom lens system that has a high zoom ratio and can achieve high optical performance over the entire zoom range.

An exemplary zoom lens system of the present invention is a zoom lens system including, in order from an object side to an image side: a first lens unit having a positive optical power; a second lens unit having a negative optical power; a third lens unit having a positive optical power; a fourth lens unit having a negative optical power; and a fifth lens unit having a positive optical power. In this zoom lens system, magnification sharing between the fourth lens unit and the fifth lens unit is set appropriately, and a movement amount of the second lens unit which is a principal magnification lens unit is set appropriately.

BRIEF DESCRIPTION OF THE DRAWINGS

FIG. 7 is an aberration chart (at an intermediate point 4) of Embodiment 1.

FIG. 8 is an aberration chart (at a telephoto end) of Embodiment 1.

FIG. 19 is an aberration chart (at the wide-angle end) of Embodiment 3.

FIG. 20 is an aberration chart (at an intermediate point 1) of Embodiment 3.

FIG. 26 is an aberration chart (at the wide-angle end) of Embodiment 4.

FIG. 27 is an aberration chart (at an intermediate point 1) of Embodiment 4.

FIG. 28 is an aberration chart (at an intermediate point 2) of Embodiment 4.

FIG. 29 is an aberration chart (at an intermediate point 3) of Embodiment 4.

BEST MODES FOR CARRYING OUT THE INVENTION

Hereinafter, a zoom lens system according to each of embodiments of the present invention and a camera including the zoom lens system are described in detail in accordance with the accompanying drawings.

The zoom lens system according to the present invention includes a first lens unit having a positive refractive power ("optical power"="reciprocal of focal length"), a second lens unit having a negative refractive power, a third lens unit having a positive refractive power, a fourth lens unit having a negative refractive power, and a fifth lens unit having a positive refractive power, which are provided in order from the object side to the image side.

When the zooming is performed, the second lens unit moves along the optical axis. The second lens unit is a principal magnification lens unit having the largest ratio of the imaging magnification at the telephoto end to that at the wide-angle end among lens units included in the zoom lens system. The fifth lens unit moves along a locus convex to the object side when the zooming is performed.

Figure 1:
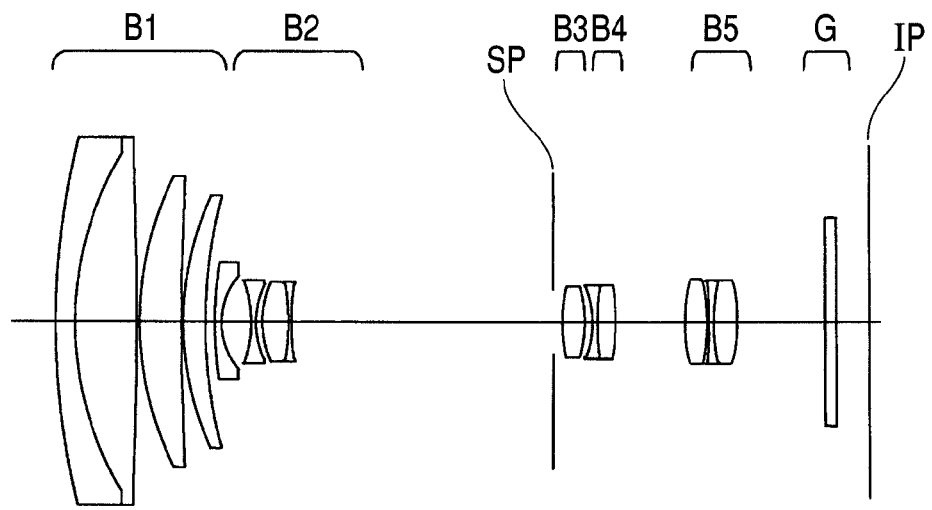
FIG. 1 is a cross sectional view of lenses at a wide-angle end of a zoom lens system according to Embodiment 1.
Figure 2:
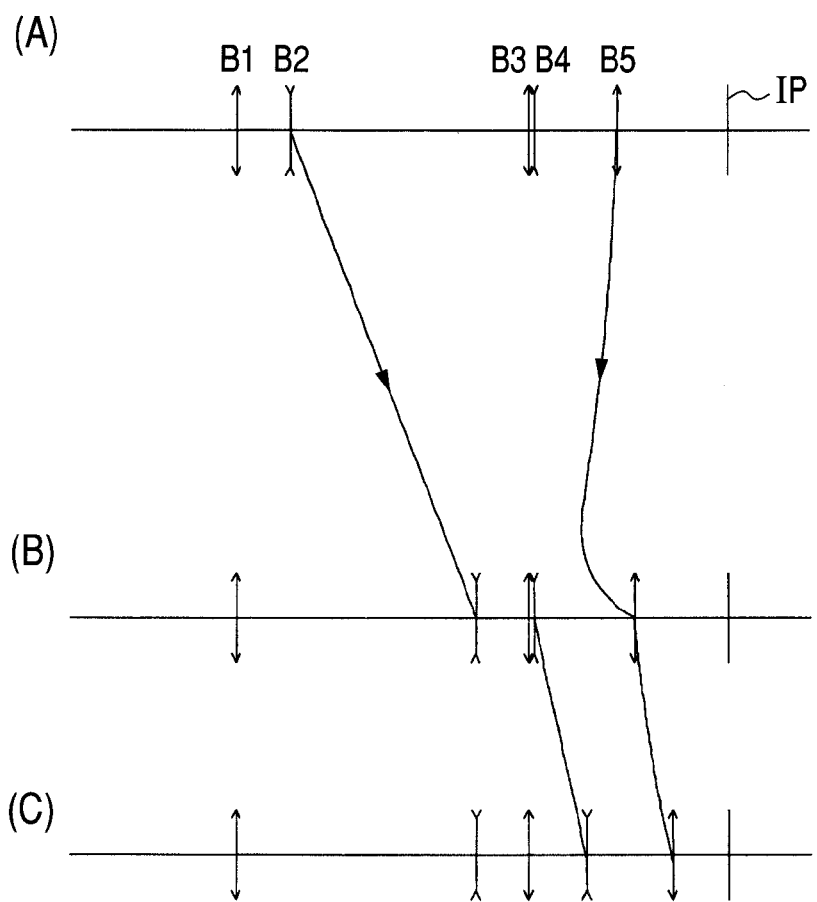
FIG. 2 illustrates motion loci of individual lens units in the zoom lens system according to Embodiment 1.
Figure 3:
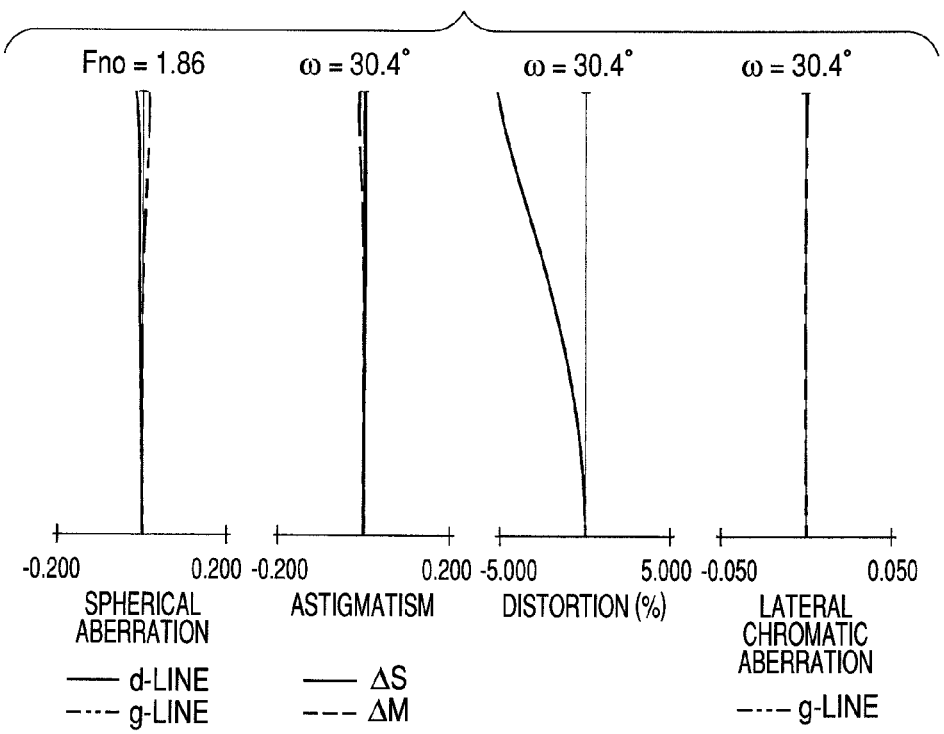
FIG. 3 is an aberration chart (at the wide-angle end) of Embodiment 1.
Figure 4:
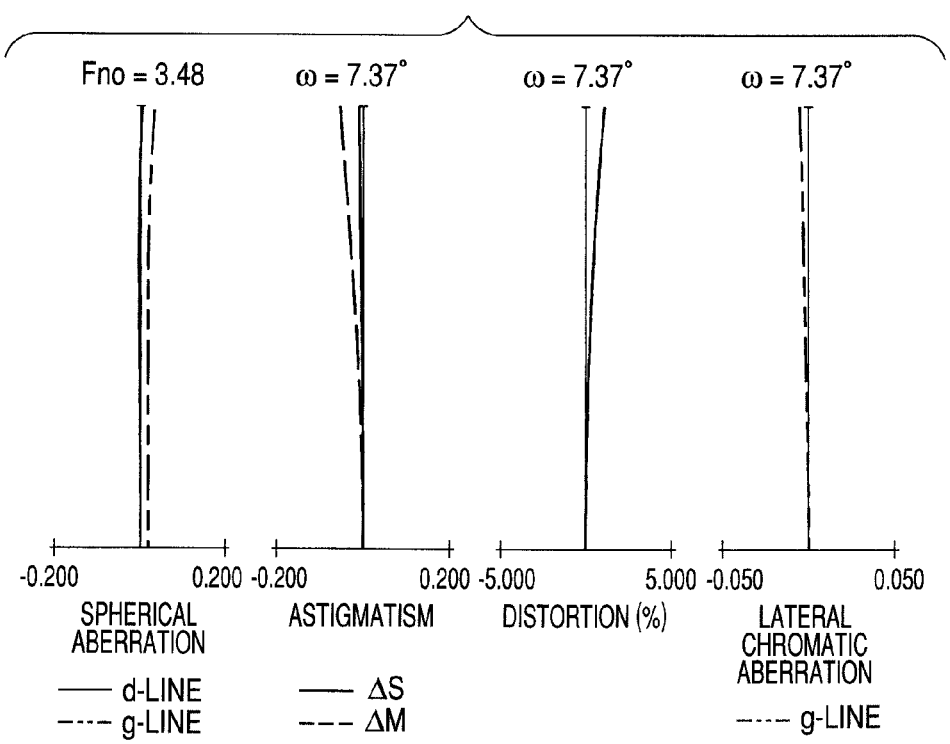
FIG. 4 is an aberration chart (at an intermediate point 1) of Embodiment 1.
Figure 5:
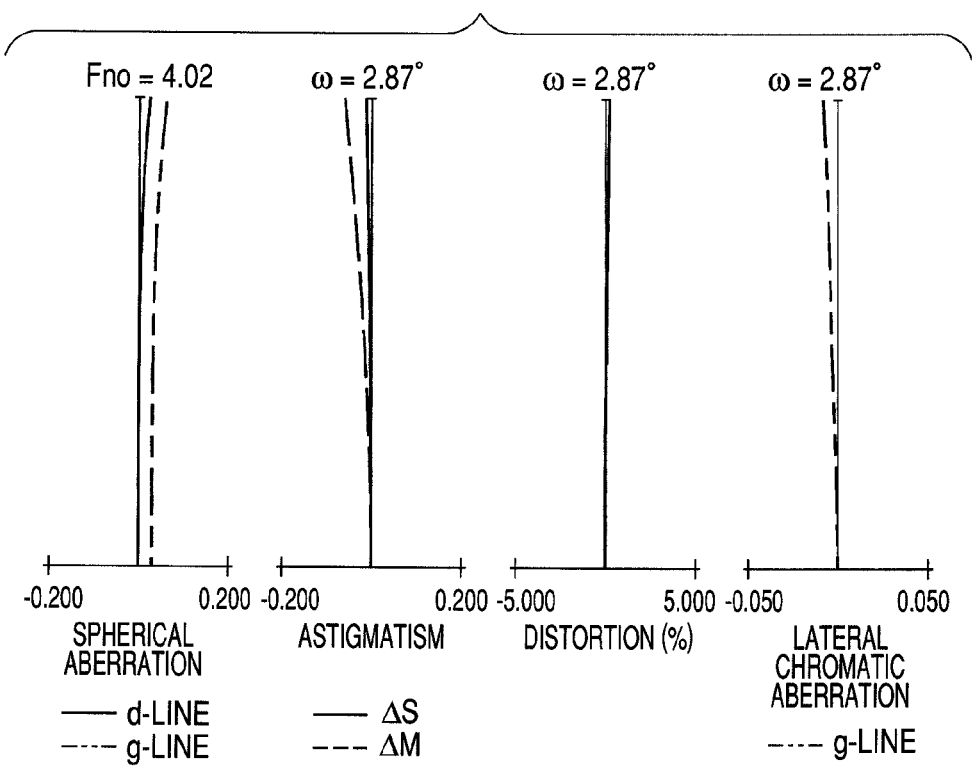
FIG. 5 is an aberration chart (at an intermediate point 2) of Embodiment 1.
Figure 6:
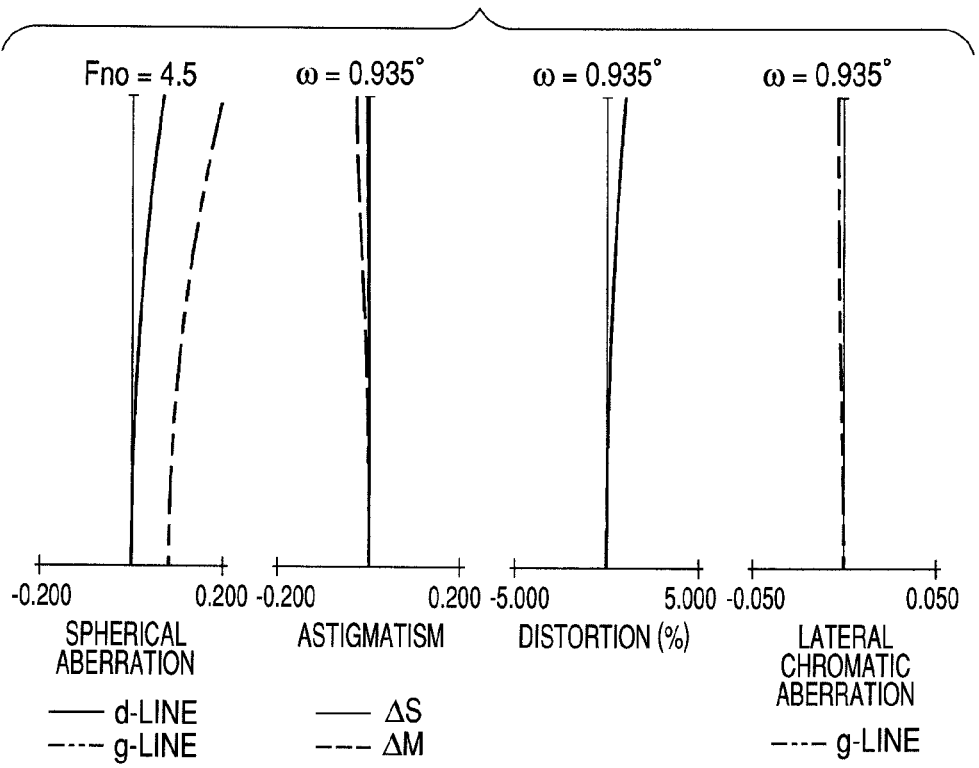
FIG. 6 is an aberration chart (at an intermediate point 3) of Embodiment 1.

FIG. 1 is a cross sectional view of a main part of a zoom lens system according to Example 1 at the wide-angle end (short focal length end). FIG. 2 is an explanatory diagram of motion loci of the lens units in the zoom lens system of Example 1. FIGS. 3 to 8 are aberration charts at the wide-angle end, at a zoom position of an intermediate point 1, at a zoom position of an intermediate point 2, at a zoom position of an intermediate point 3, at a zoom position of an intermediate point 4, and at a telephoto end (long focal length end) of the zoom lens system of Example 1, respectively.

Figure 9:
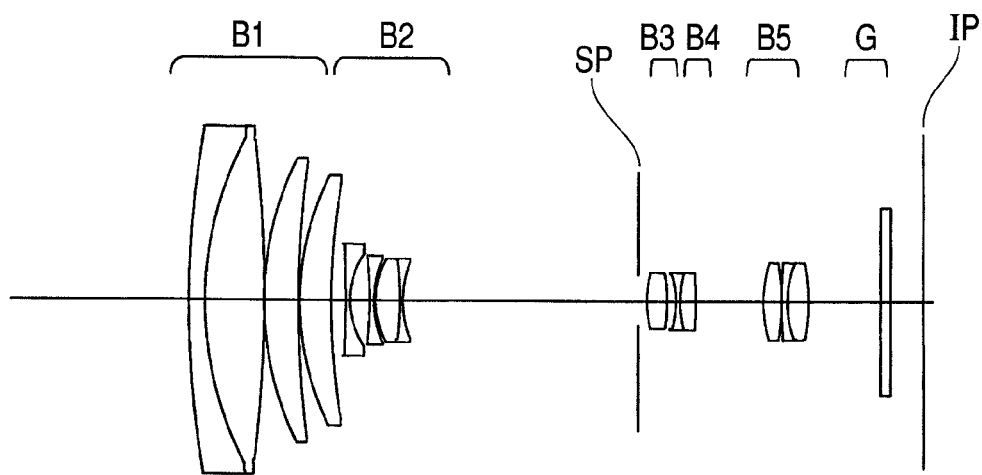
FIG. 9 is a cross sectional view of lenses at a wide-angle end of a zoom lens system according to Embodiment 2.
Figure 10:
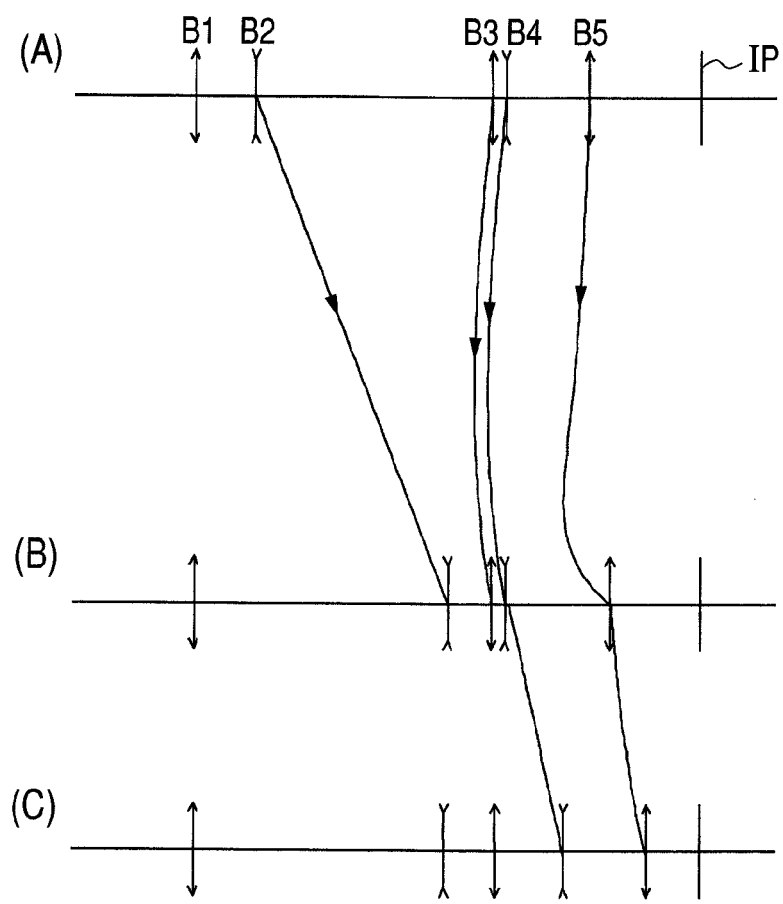
FIG. 10 illustrates motion loci of individual lens units in the zoom lens system according to Embodiment 2.
Figure 11:
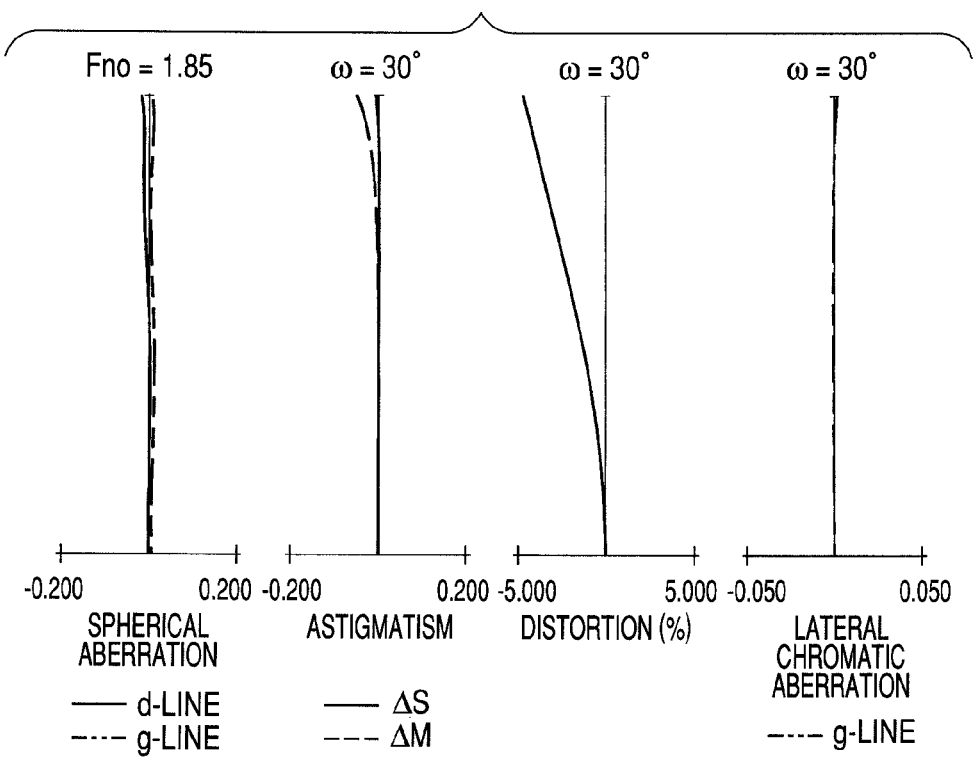
FIG. 11 is an aberration chart (at the wide-angle end) of Embodiment 2.
Figure 12:
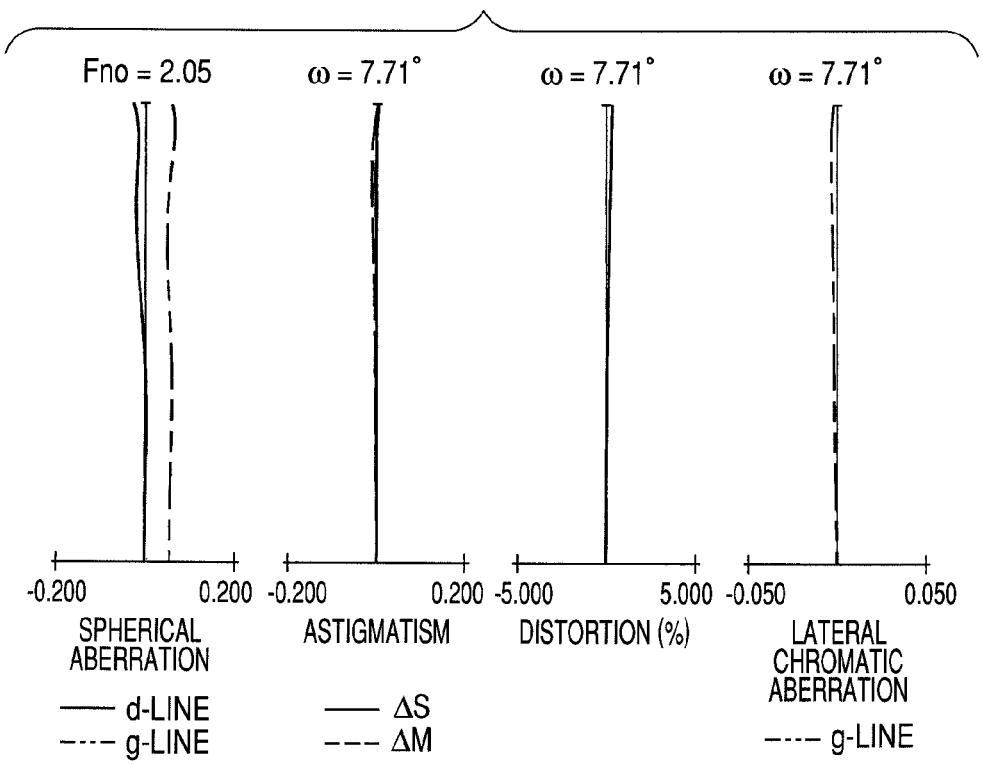
FIG. 12 is an aberration chart (at an intermediate point 1) of Embodiment 2.
Figure 13:
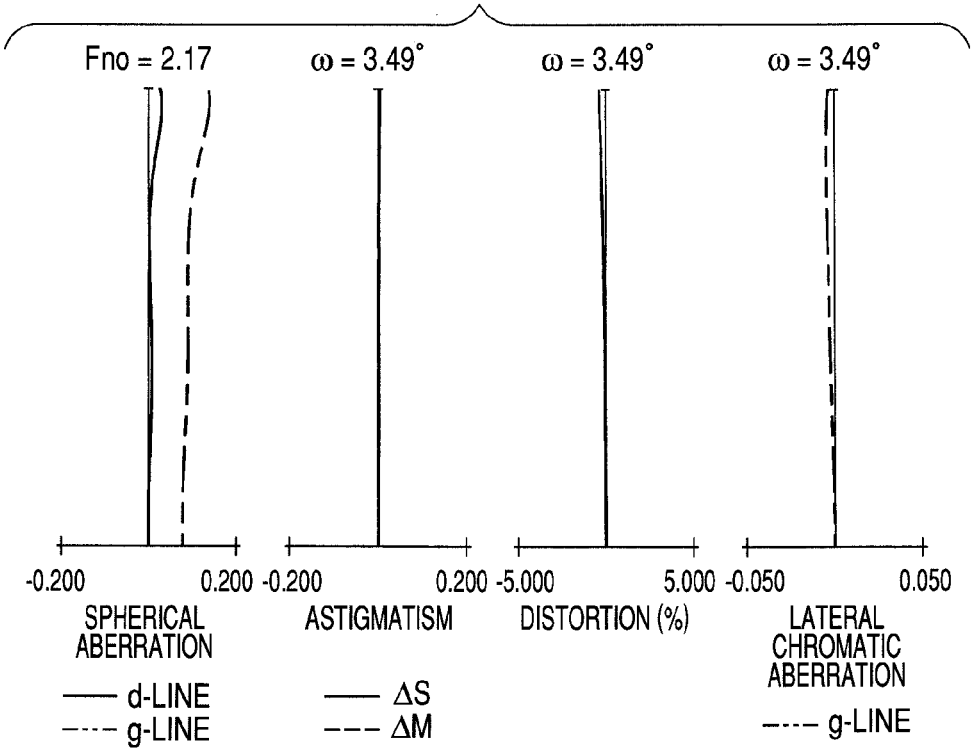
FIG. 13 is an aberration chart (at an intermediate point 2) of Embodiment 2.
Figure 14:
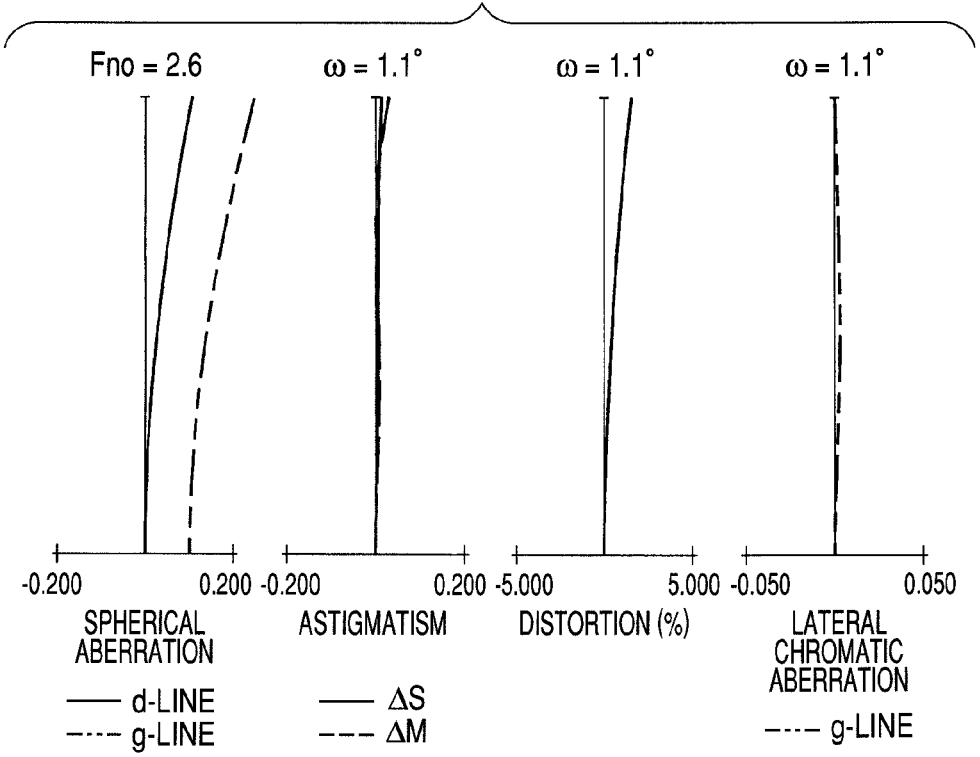
FIG. 14 is an aberration chart (at an intermediate point 3) of Embodiment 2.
Figure 15:
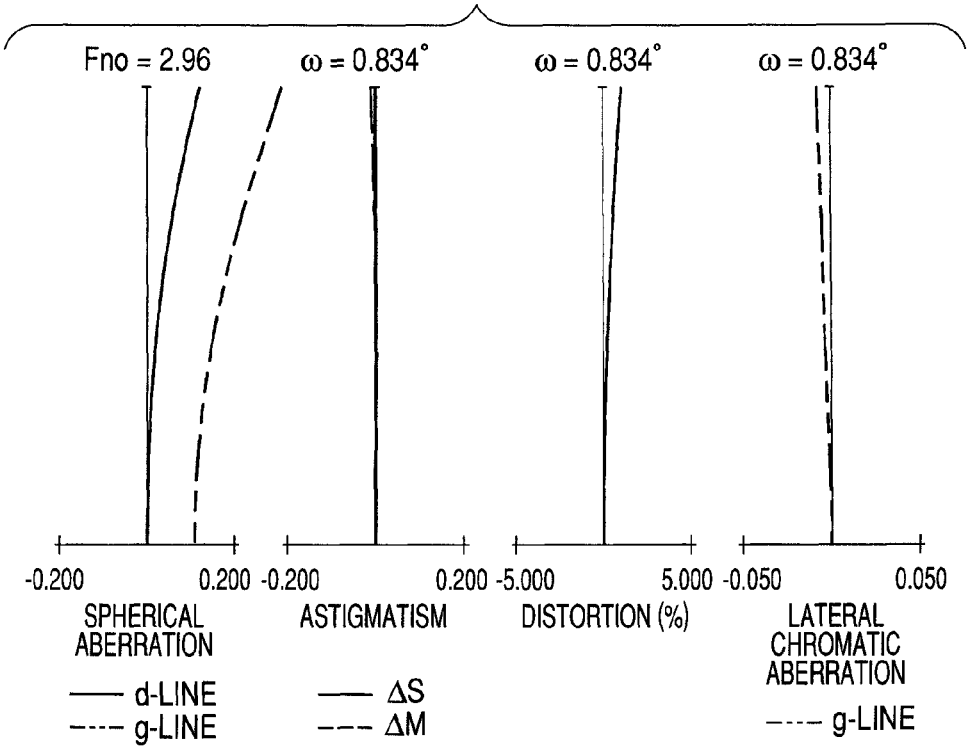
FIG. 15 is an aberration chart (at an intermediate point 4) of Embodiment 2.
Figure 16:
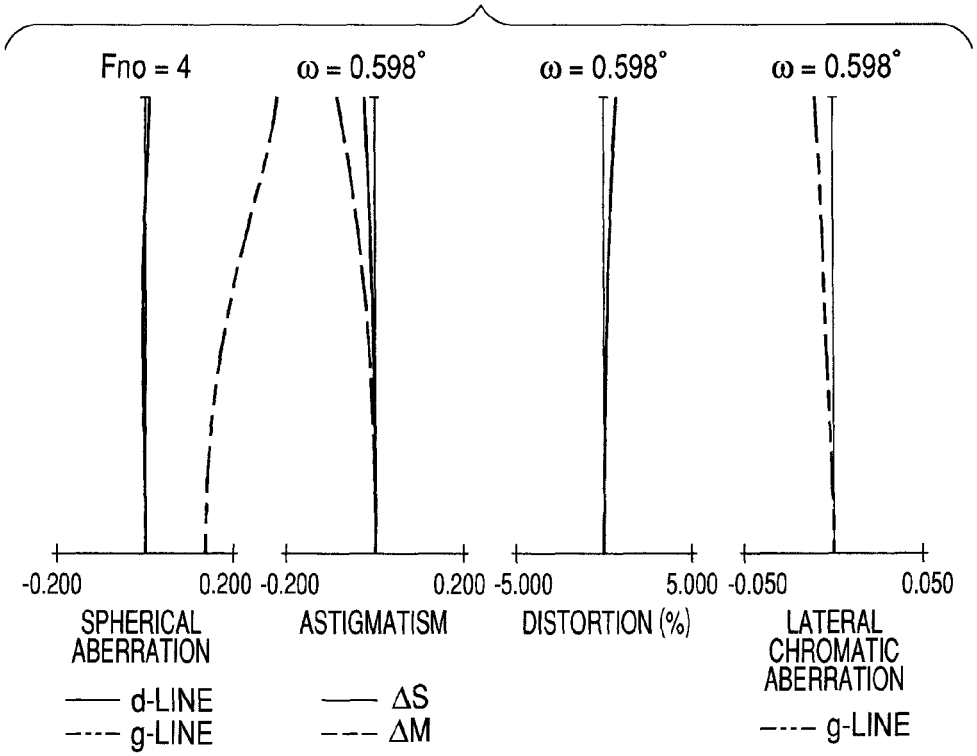
FIG. 16 is an aberration chart (at a telephoto end) of Embodiment 2.

FIG. 9 is a cross sectional view of a main part of a zoom lens system according to Example 2 at the wide-angle end. FIG. 10 is an explanatory diagram of motion loci of the lens units in the zoom lens system of Example 2. FIGS. 11 to 16 are aberration charts at the wide-angle end, at a zoom position of an intermediate point 1, at a zoom position of an intermediate point 2, at a zoom position of an intermediate point 3, at a zoom position of an intermediate point 4, and at a telephoto end of the zoom lens system of Example 2, respectively.

Figure 17:
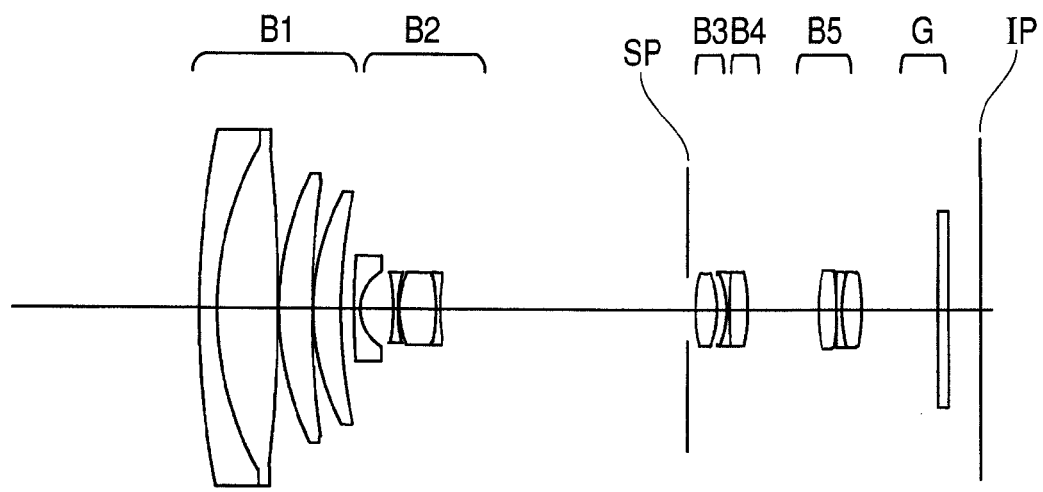
FIG. 17 is a cross sectional view of lenses at a wide-angle end of a zoom lens system according to Embodiment 3.
Figure 18:
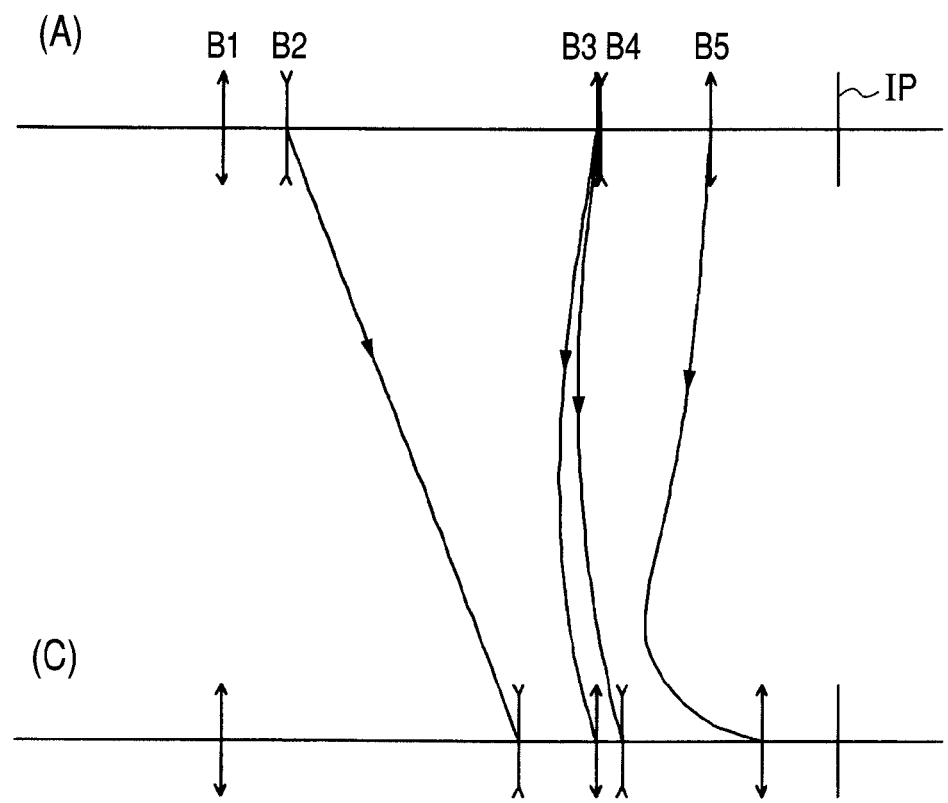
FIG. 18 illustrates motion loci of individual lens units in the zoom lens system according to Embodiment 3.
Figure 21:
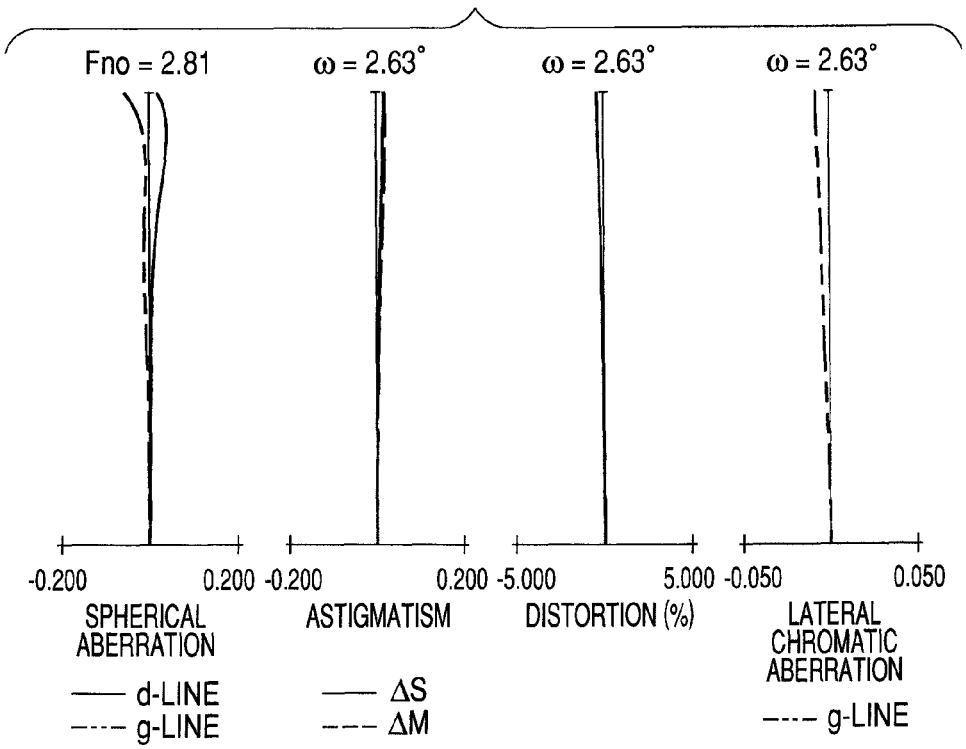
FIG. 21 is an aberration chart (at an intermediate point 2) of Embodiment 3.
Figure 22:
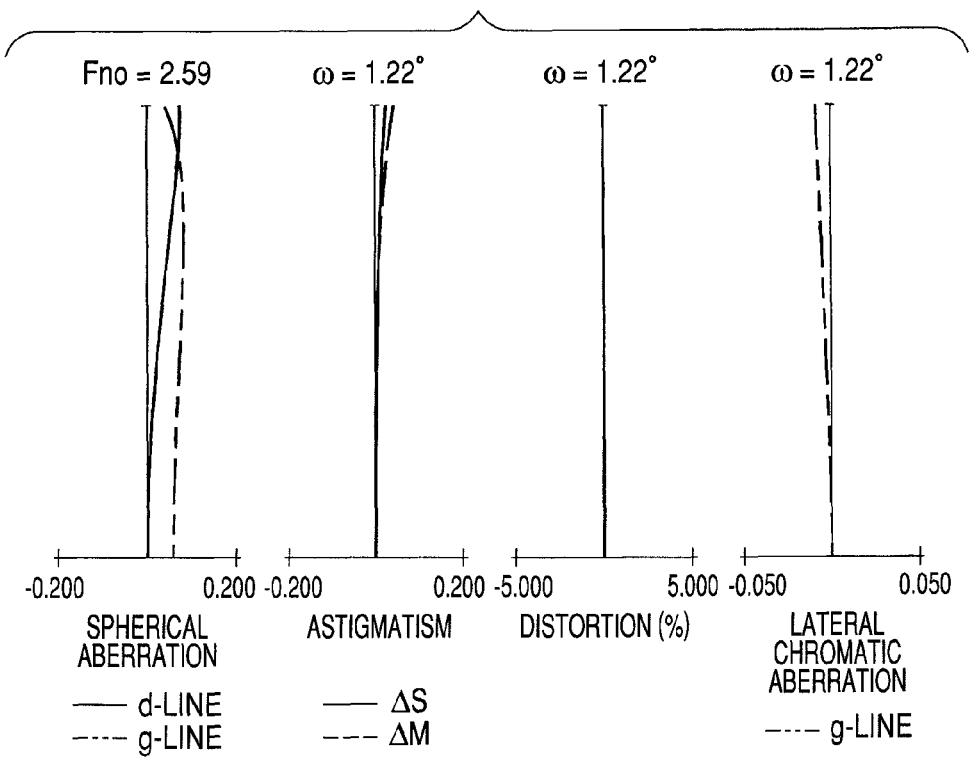
FIG. 22 is an aberration chart (at an intermediate point 3) of Embodiment 3.
Figure 23:
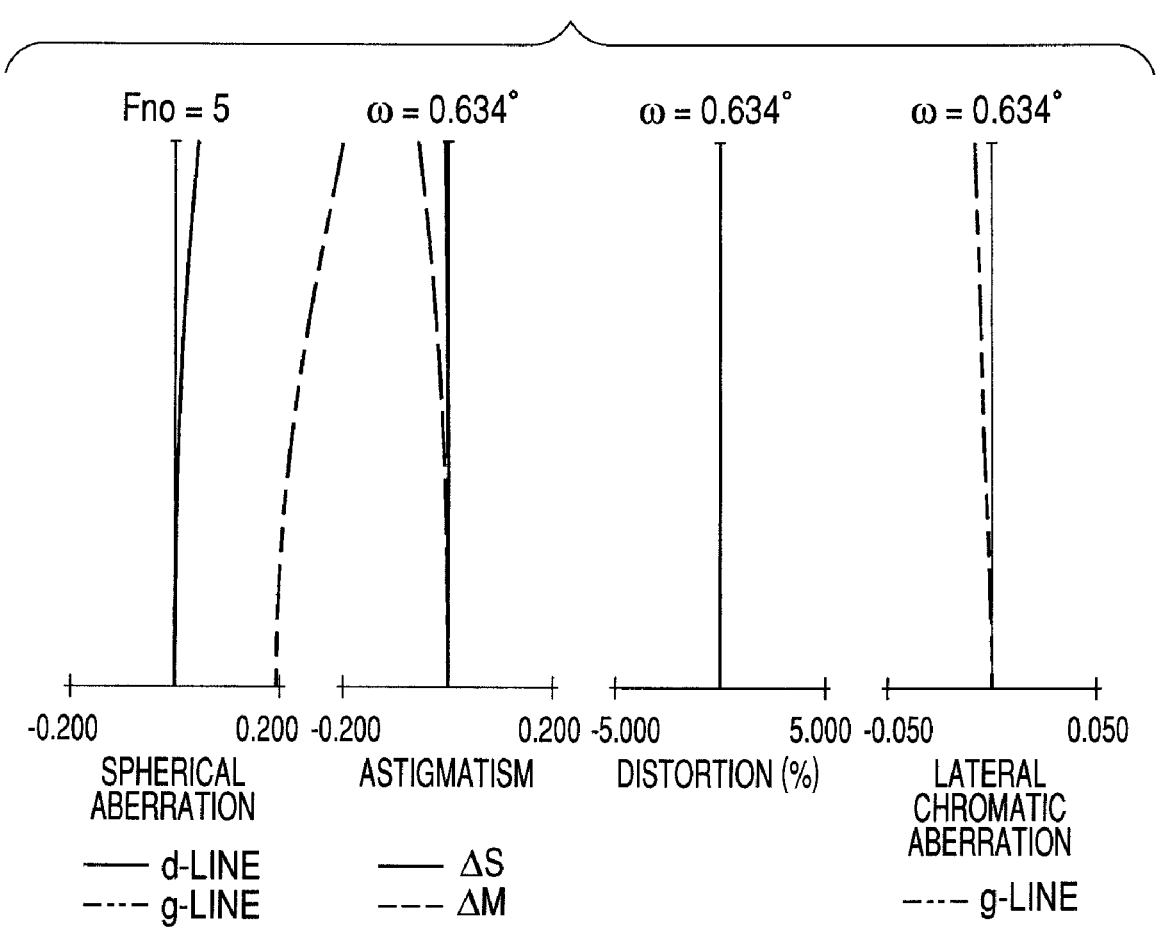
FIG. 23 is an aberration chart (at a telephoto end) of Embodiment 3.

FIG. 17 is a cross sectional view of a main part of a zoom lens system of Example 3 at the wide-angle end. FIG. 18 is an explanatory diagram of motion loci of the lens units in the zoom lens system of Example 3. FIGS. 19 to 23 are aberration charts at the wide-angle end, at a zoom position of an intermediate point 1, at a zoom position of an intermediate point 2, at a zoom position of an intermediate point 3, and at a telephoto end of the zoom lens system of Example 3, respectively.

Figure 24:
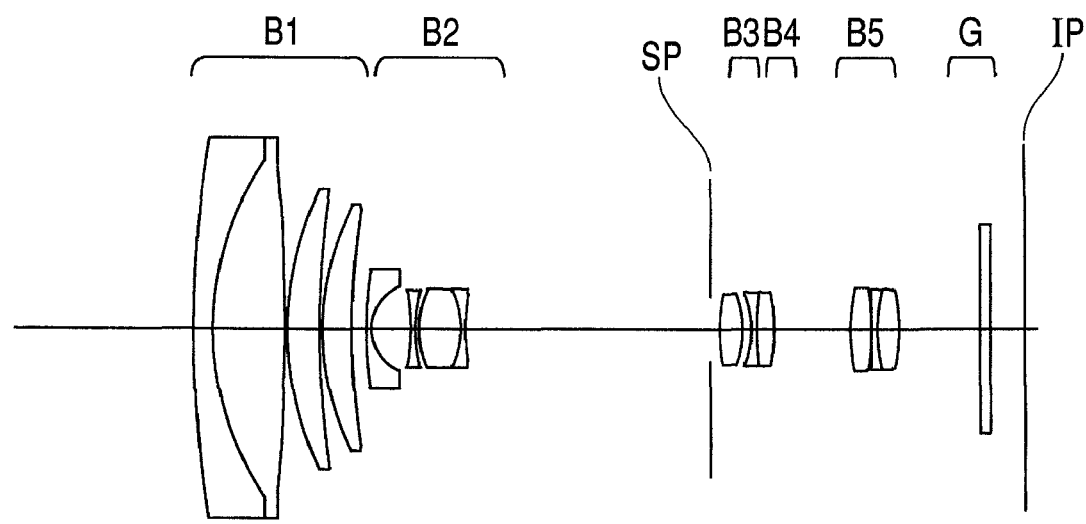
FIG. 24 is a cross sectional view of lenses at a wide-angle end of a zoom lens system according to Embodiment 4.
Figure 25:
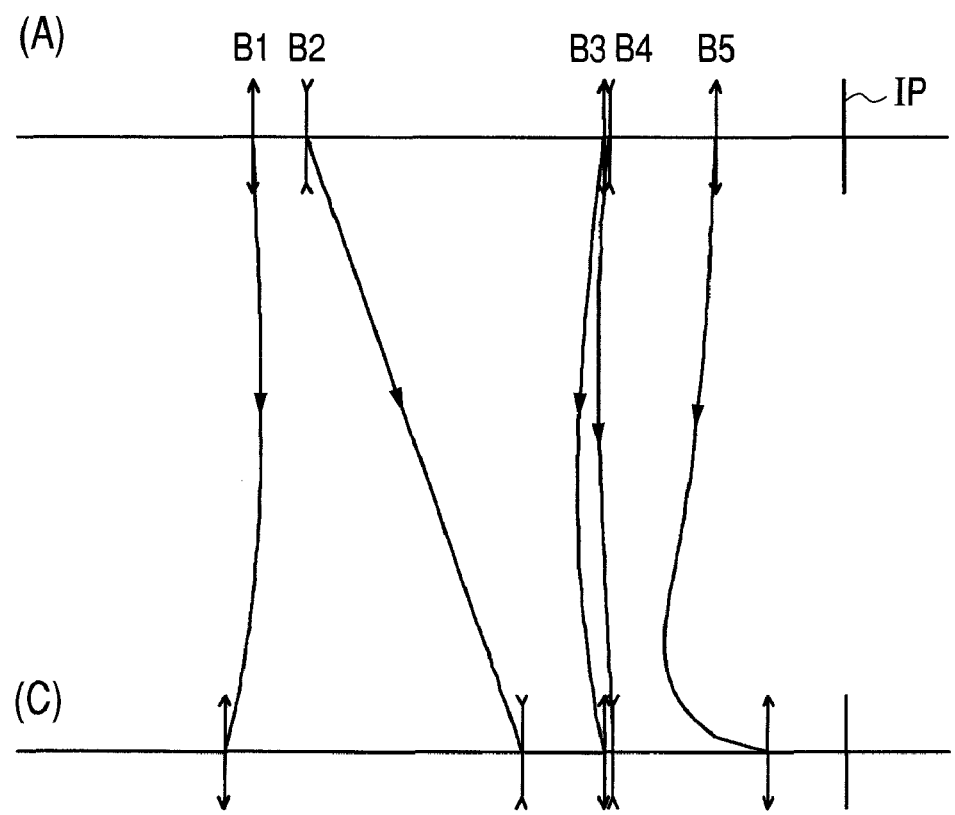
FIG. 25 illustrates motion loci of individual lens units in the zoom lens system according to Embodiment 4.
Figure 30:
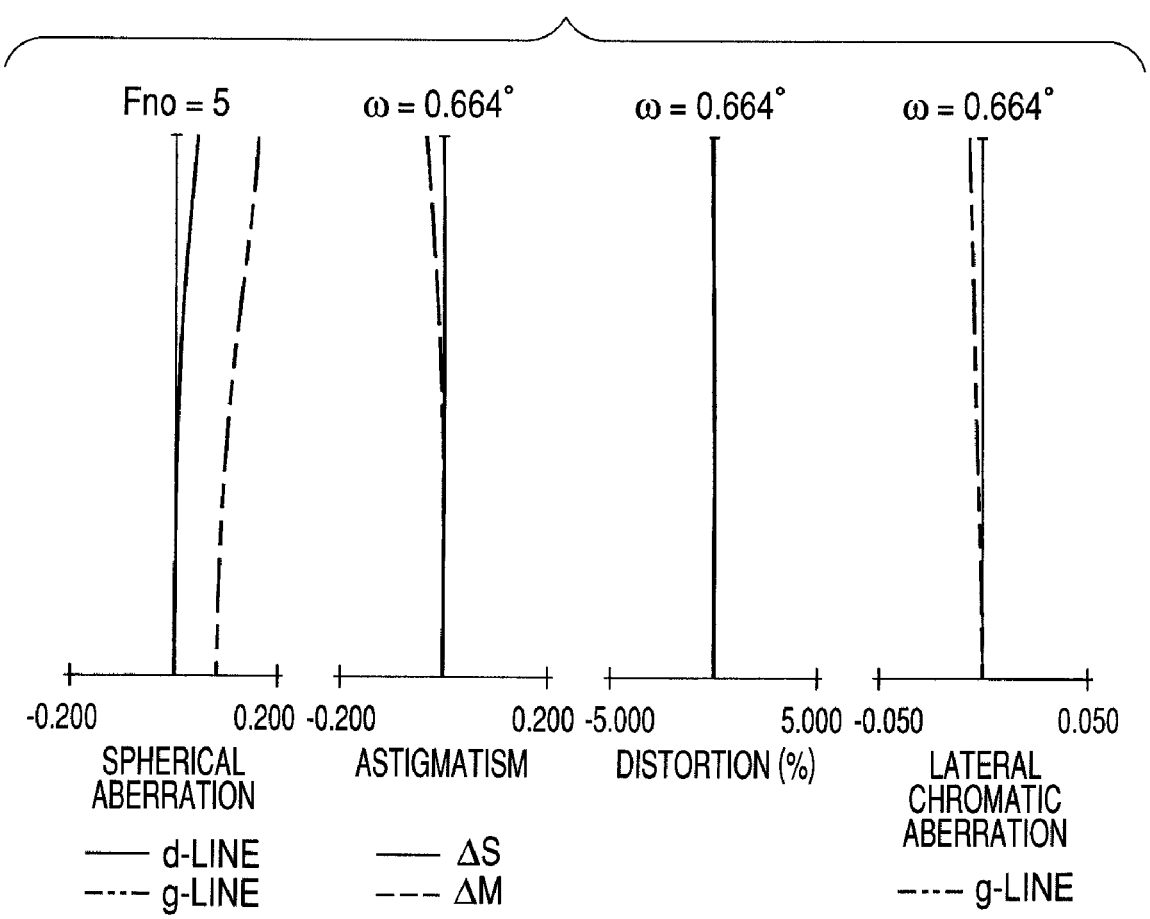
FIG. 30 is an aberration chart (at a telephoto end) of Embodiment 4.

FIG. 24 is a cross sectional view of a main part of a zoom lens system of Example 4 at the wide-angle end. FIG. 25 is an explanatory diagram of motion loci of the lens units in the zoom lens system of Example 4. FIGS. 26 to 30 are aberration charts at the wide-angle end, at a zoom position of an intermediate point 1, at a zoom position of an intermediate point 2, at a zoom position of an intermediate point 3, and at a telephoto end of the zoom lens system of Example 4, respectively.

Figure 31:
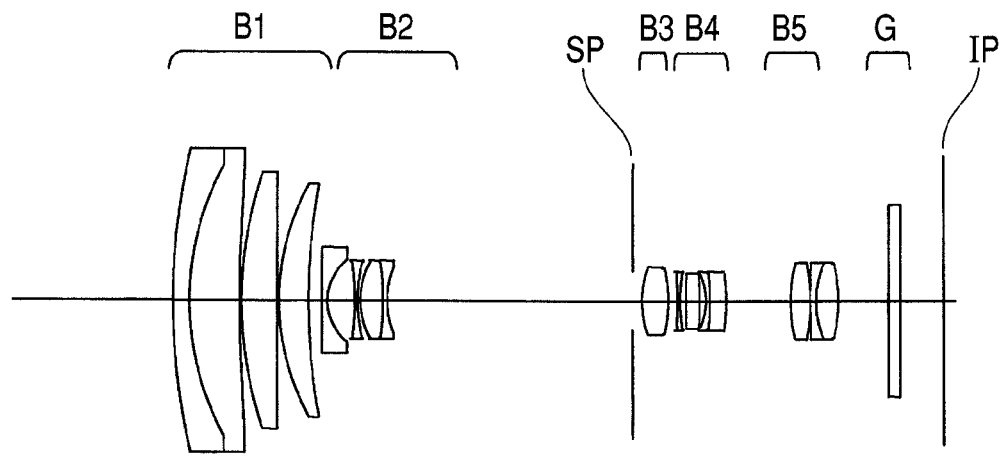
FIG. 31 is a cross sectional view of lenses at a wide-angle end of a zoom lens system according to Embodiment 5.
Figure 32:
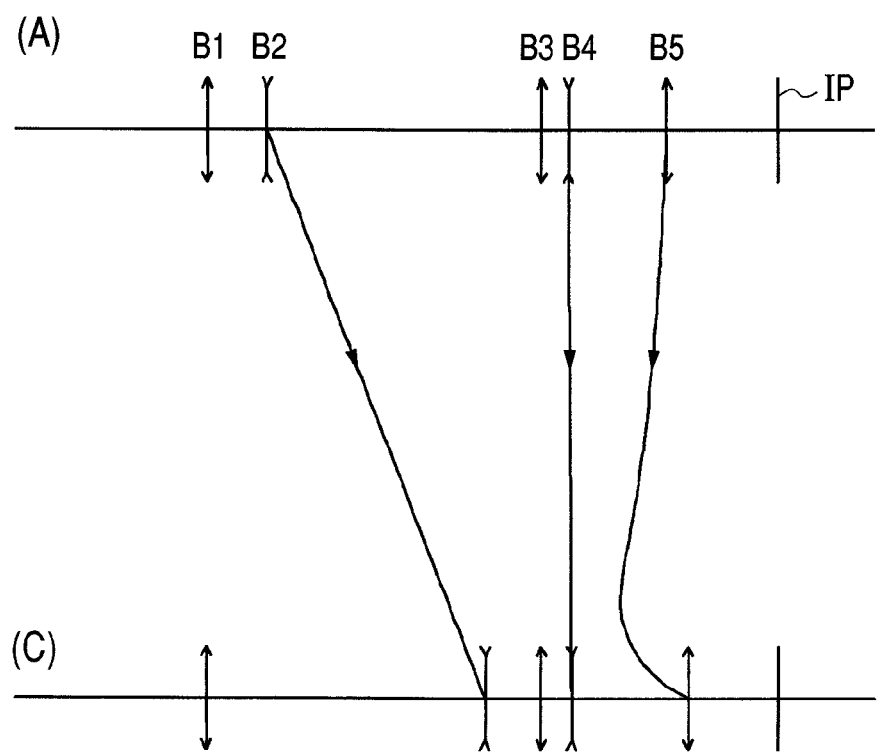
FIG. 32 illustrates motion loci of individual lens units in the zoom lens system according to Embodiment 5.
Figure 33:
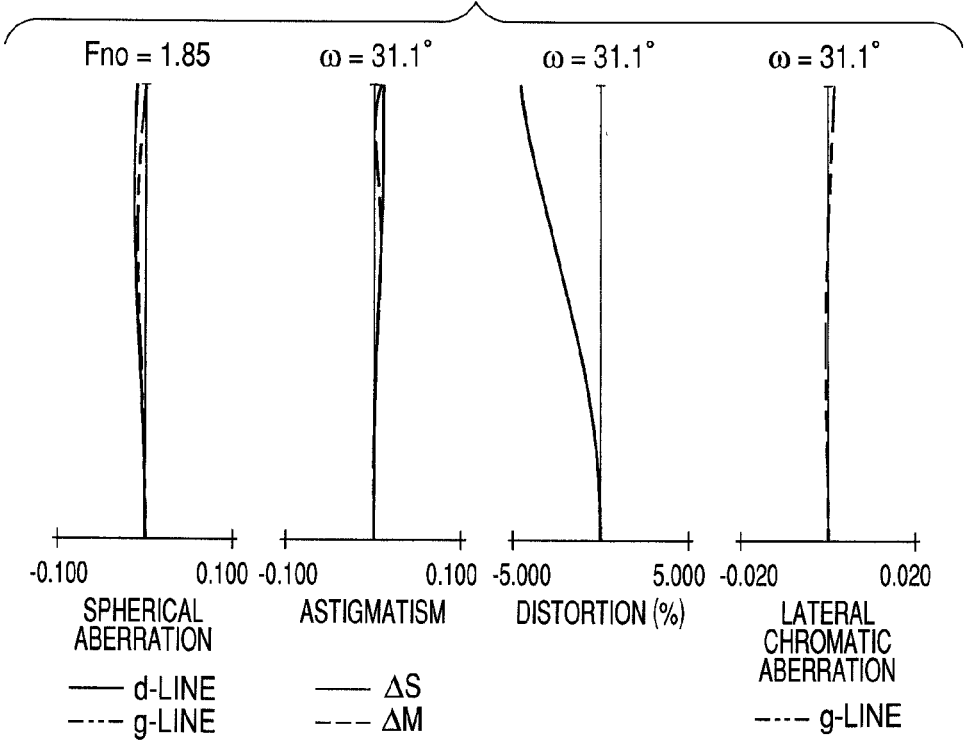
FIG. 33 is an aberration chart (at the wide-angle end) of Embodiment 5.
Figure 34:
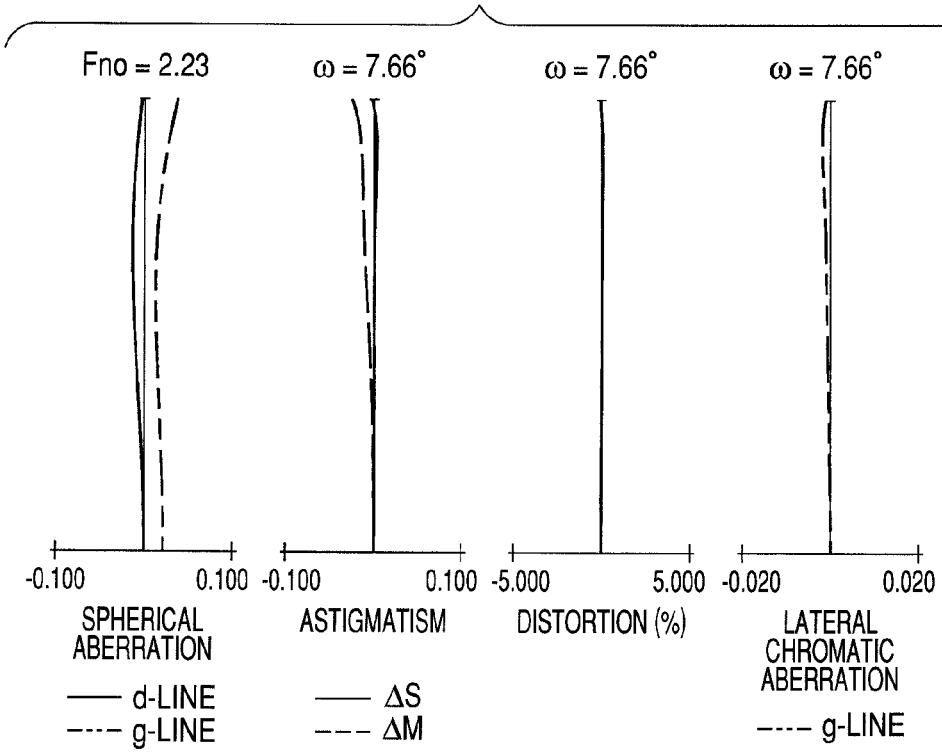
FIG. 34 is an aberration chart (at an intermediate point 1) of Embodiment 5.
Figure 35:
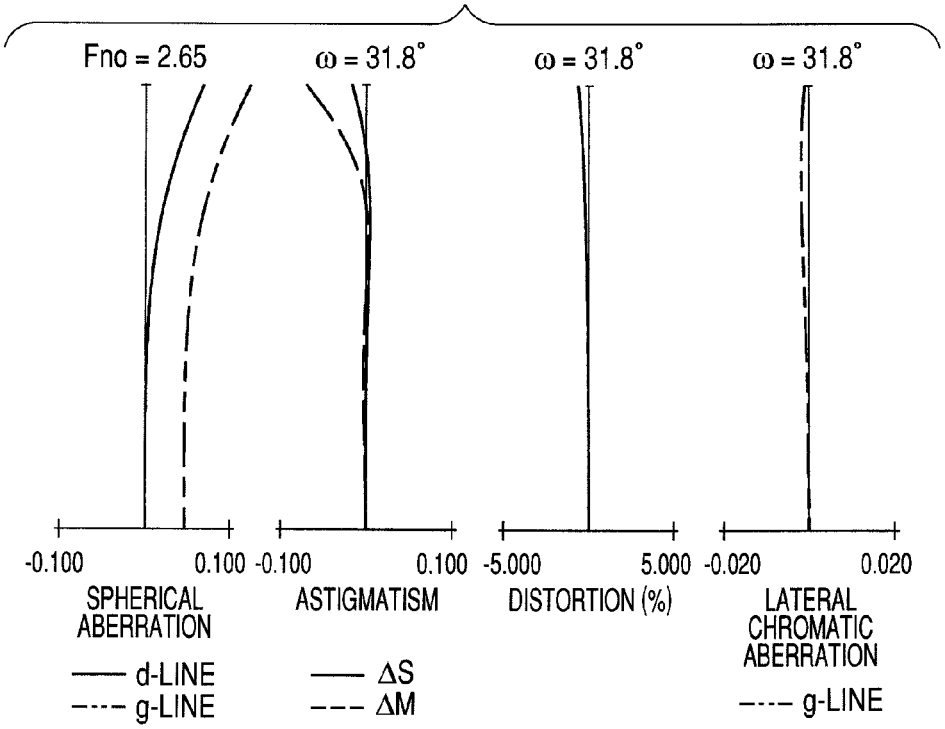
FIG. 35 is an aberration chart (at an intermediate point 2) of Embodiment 5.
Figure 36:
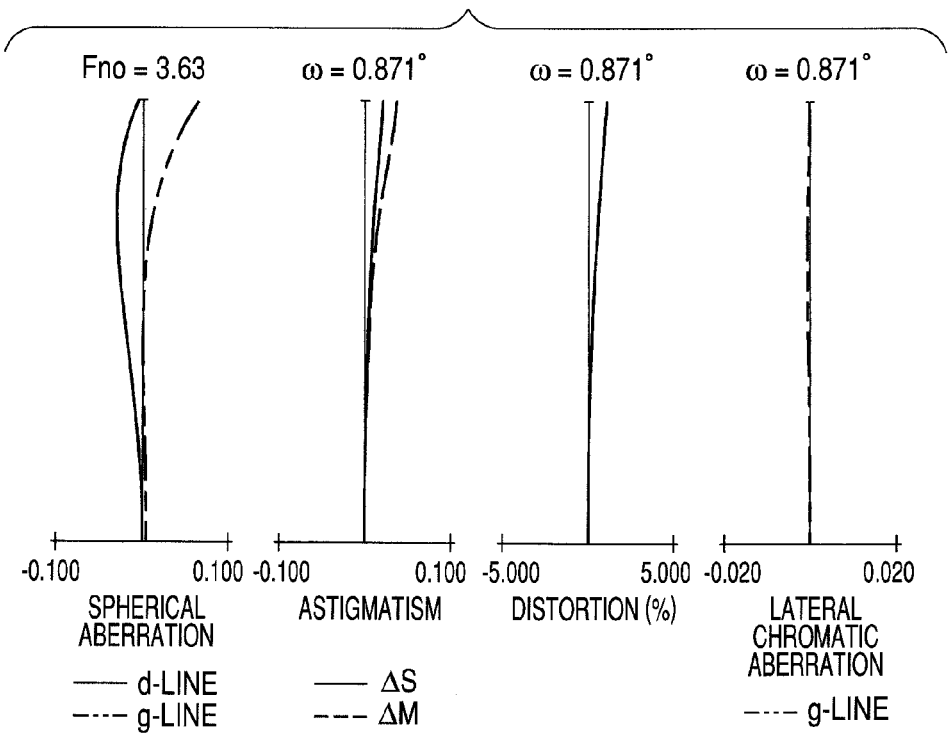
FIG. 36 is an aberration chart (at a telephoto end) of Embodiment 5.

FIG. 31 is a cross sectional view of a main part of a zoom lens system of Example 5 at the wide-angle end. FIG. 32 is an explanatory diagram of motion loci of the lens units in the zoom lens system of Example 5. FIGS. 33 to 36 are aberration charts at the wide-angle end, at a zoom position of an intermediate point 1, at a zoom position of an intermediate point 2, and at a telephoto end of the zoom lens system of Example 5, respectively.

Note that focal lengths of the zoom positions of the intermediate points 1 to 4 in the individual embodiments correspond to focal lengths of multiple zoom positions between the wide-angle end and the telephoto end in the numerical embodiments described later.

Figure 37:
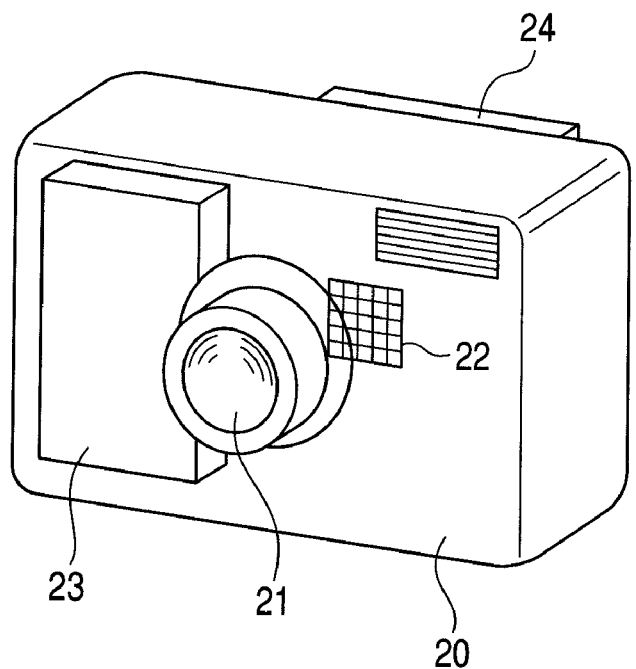
FIG. 37 is a schematic view of a main part of a camera according to the present invention.
Figure 38:
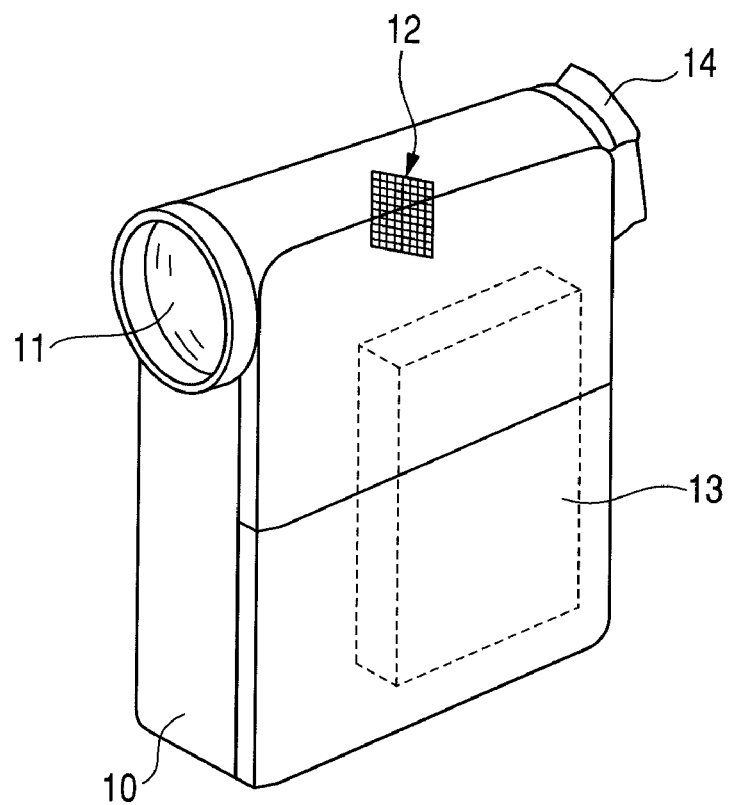
FIG. 38 is a schematic view of a main part of a camera according to the present invention.

FIGS. 37 and 38 are schematic views illustrating main parts of cameras including the zoom lens system according to the present invention.

The zoom lens system according to each of the embodiments is a shooting lens system used for a video camera, a digital camera, or the like. In the cross sectional views of the lenses, the left side corresponds to the object side (front side) and the right side corresponds to the image side (rear side).

In the cross sectional views of the lenses, a first lens unit B1 has a positive refractive power, a second lens unit B2 has a negative refractive power, a third lens unit B3 has a positive refractive power, a fourth lens unit B4 has a negative refractive power, and a fifth lens unit B5 has a positive refractive power.

In the zoom lens system according to each of the embodiments, the aperture stop SP is provided in the object side of the third lens unit B3.

An optical block G corresponds to an optical filter, a face plate (parallel plate glass), a quartz low-pass filter, or an infrared cut filter.

When the zoom lens system according to the present invention is used as a shooting optical system of a video camera or a digital still camera, an imaging plane of a solid-state image pickup element (photoelectric transducer) such as a CCD sensor or a CMOS sensor is provided at an image plane IP.

In the explanatory diagrams illustrating the motion loci of the individual lens units, Section (A) illustrates the wide-angle end, Section (B) illustrates the intermediate zoom position, and Section (C) illustrates the telephoto end.

Further, arrows indicate motion loci of the lens units in the zooming from the wide-angle end to the telephoto end.

In the aberration charts, a meridional image plane and a sagittal plane are denoted by reference symbols ΔM and ΔS, respectively. A half field angle (half value of shooting field angle) is denoted by reference symbol ω and an f-number is denoted by reference symbol Fno.

In each of the embodiments, movement conditions of the lens units in the zooming from the wide-angle end to the telephoto end are as follows.

In Embodiment 1, from the wide-angle end (A) to the intermediate zoom position (B), the second lens unit B2 moves to the image side while the fifth lens unit B5 moves along a locus convex to the object side.

From the intermediate zoom position (B) to the telephoto end (C), the fourth lens unit B4 and the fifth lens unit B5 move independently of each other to the image side. The first lens unit B1 and the third lens unit B3 do not move for the zooming.

In Embodiment 2, from the wide-angle end (A) to the intermediate zoom position (B), the second lens unit B2 moves to the image side. The third lens unit B3 and the fourth lens unit B4 move as one unit along the respective loci convex to the object side. The fifth lens unit B5 moves along a locus convex to the object side.

From the intermediate zoom position (B) to the telephoto end (C), the fourth lens unit B4 and the fifth lens unit B5 move independently of each other to the image side. The first lens unit B1 does not move for the zooming.

Thus, in Embodiments 1 and 2, a so-called double zoom method is used for realizing a high zoom ratio.

In Embodiment 3, when the zooming is performed from the wide-angle end (A) to the telephoto end (C), the second lens unit B2 moves to the image side. The third lens unit B3, the fourth lens unit B4, and the fifth lens unit B5 move independently of each other along the respective loci convex to the object side. The first lens unit B1 does not move for the zooming.

In Embodiment 4, when the zooming is performed from the wide-angle end to the telephoto end, the first lens unit B1 moves along a locus convex to the image side. The second lens unit B2 moves to the image side. The third lens unit B3, the fourth lens unit B4, and the fifth lens unit B5 move independently of each other along the respective loci convex to the object side.

In Embodiment 5, when the zooming is performed from the wide-angle end to the telephoto end, the second lens unit B2 and the fourth lens unit B4 move to the image side. The fifth lens unit B5 moves along a locus convex to the object side. The first lens unit B1 and the third lens unit B3 do not move for the zooming.

In the zoom lens system of each embodiment, the second lens unit B2 is the principal magnification lens unit. Here, the principal magnification lens unit means a lens unit having the largest ratio of the imaging magnification at the telephoto end to that at the wide-angle end among all the lens units included in the zoom lens system.

In addition, in the zoom lens system of each embodiment, the fifth lens unit B5 moves along a locus convex to the object side at least by a part thereof when the zooming is performed.

Each of the embodiments adopts a rear focus method in which the fifth lens unit B5 is moved along the optical axis for the focusing. When the focusing is performed at the telephoto end from an object at infinity to an object at a near point, the fifth lens unit B5 is driven forward for the focusing.

The zoom lens system of each embodiment adopts a zoom type in which it is easy to secure a high zoom ratio and to correct aberration appropriately. In other words, the lens structure includes lens units having positive, negative, positive, negative and positive refractive powers in this order from the object side to the image side.

If the first lens unit B1 is fixed with respect to an imaging plane when the zooming is performed as described in Embodiments 1 to 3 and 5, it is easy to maintain high positional accuracy.

In addition, it is possible to reduce the number of movable lens units so that mechanical components can be simplified. If the mechanical components are simplified, it is possible to reduce generation of garbage or the like. In addition, it is preferable because strength can be secured when an accessory such as a converter lens is attached.

The present invention is supposed to be applied to the zoom lens system that has five lens units as in each embodiment, in which the second lens unit is the principal magnification lens unit, and the fifth lens unit moves along a locus convex to the object side at least by a part thereof when the zooming is performed. In such a zoom lens system, the conditional expression (1) below is satisfied, or the conditional expressions (1) and (2) are satisfied.

$$1.4 < \max|\beta 4 \times \beta 5|/\min|\beta 4 \times \beta 5| < 14 \quad (1)$$

$$0.4 < st2/fw < 20 \quad (2)$$

Here, $\max|\beta 4 \times \beta 5|$ indicates a maximum value of a product of a lateral magnification $\beta 4$ of the fourth lens unit and a lateral magnification $\beta 5$ of the fifth lens unit in the zooming from the wide-angle end to the telephoto end. Further, $\min|\beta 4 \times \beta 5|$ indicates a minimum value of a product of the lateral magnification $\beta 4$ of the fourth lens unit and the lateral magnification $\beta 5$ of the fifth lens unit in the zooming from the wide-angle end to the telephoto end.

In addition, st2 denotes a movement amount of the second lens unit in the zooming from the wide-angle end to the telephoto end. The movement amount has a positive sign for a movement to the image side and a negative sign for a movement in the opposite direction. Further, fw denotes a focal length of the entire system at the wide-angle end.

Note that the movement amount st2 of the second lens unit corresponds to a displacement of a position at the telephoto end with respect to a position at the wide-angle end. Therefore, if the position of the second lens unit at the wide-angle end is the same as the position of the second lens unit at the telephoto end, the movement amount st2 of the second lens unit is zero. In addition, if the second lens unit does not move for the zooming from the wide-angle end to the telephoto end and another lens unit or the solid-state image pickup element moves relatively, the movement amount st2 of the second lens unit is also zero.

The conditional expression (1) defines magnification actions of the fourth lens unit and the fifth lens unit in the zooming, and is a condition for securing a high zoom ratio.

If $\max|\beta 4 \times \beta 5|/\min|\beta 4 \times \beta 5|$ becomes smaller than the lower limit of the conditional expression (1), it means that the magnification actions of the fourth lens unit and the fifth lens unit become too small. As a result, it is difficult to realize a high zoom ratio. In addition, it becomes also difficult to downsize the entire system and to reduce a variation in lateral chromatic aberration at the telephoto end or its vicinity. On the contrary, if $\max|\beta 4 \times \beta 5|/\min|\beta 4 \times \beta 5|$ becomes greater than the upper limit of the conditional expression (1), a high zoom ratio can be realized easily, but a variation of the imaging plane in the zooming increases. As a result, it is difficult to maintain the high optical performance.

The numerical range of the conditional expression (1) is, more preferably, set as follows.

$$1.9 < \max|\beta 4 \times \beta 5|/\min|\beta 4 \times \beta 5| < 12 \quad (1a)$$

More preferably, the numerical range of the conditional expression (1a) is set as the conditional expression (1b). Thus, a variation in lateral chromatic aberration at the telephoto end or its vicinity can be suppressed appropriately, and sensitivity of a focal position of the fifth lens unit at the telephoto end or its vicinity can be corrected appropriately.

$$4.0 < \max|\beta 4 \times \beta 5|/\min|\beta 4 \times \beta 5| < 12 \quad (1b)$$

The conditional expression (2) is related to the movement amount of the second lens unit in the zooming.

By increasing the movement amount of the first lens unit, a high zoom ratio can also be realized. In this case, however, the first lens unit must be moved largely to the object side at the telephoto end. Therefore, the entire length of the lenses at the telephoto end becomes large. In addition, decentering sensitivity of the first lens unit at the telephoto end is also increased. Therefore, it is preferable to set the movement amount of the second lens unit appropriately so as to satisfy the conditional expression (2).

If the movement amount of the second lens unit is increased so that st2/fw becomes greater than the upper limit of the conditional expression (2), it is not good because the entire system becomes long. On the contrary, if the movement amount is decreased so that st2/fw becomes smaller than the lower limit of the conditional expression (2), it is difficult to realize a high zoom ratio because a magnification ratio of the second lens unit becomes too small.

If both the conditional expression (1) and the conditional expression (2) are satisfied, it is not necessary to be the zoom lens system in which the first lens unit moves in the zooming.

In order to decrease the decentering sensitivity and the entire length of the lenses of the second lens unit at the telephoto end, the numerical range of the conditional expression (2) is preferably set as follows.

$$1.0 < st2/fw < 15 \tag{2a}$$

More preferably, the numerical range should be set so as to satisfy the conditional expression (2b).

$$2.0 < st2/fw < 12 \tag{2b}$$

The zoom lens system as the initial purpose of the present invention is realized by satisfying the above-mentioned structure, but it is preferable to satisfy at least one of the following conditional expressions (3) to (5) in order to realize the zoom lens system that can maintain a high zoom ratio and has high optical performance in small size.

$$3.0 < |f4|/fw < 12 \tag{3}$$

$$0.82 < |f2|/fw < 5.0 \tag{4}$$

$$39 < |\beta2T/\beta2W| < 350 \tag{5}$$

Here, f2 denotes a focal length of the second lens unit, f4 denotes a focal length of the fourth lens unit, and β2T and β2W respectively denote lateral magnifications at the wide-angle end and at the telephoto end of the second lens unit.

Technical meanings of the individual conditional expressions are described.

The conditional expression (3) relates to an optical power of the fourth lens unit.

If the optical power of the fourth lens unit becomes too strong so that |f4|/fw becomes smaller than the lower limit of the conditional expression (3), aberration may frequently occur in the fourth lens unit. In particular, field curvature and astigmatism may occur largely. In order to correct such aberration appropriately, it is necessary to increase the number of lenses of the fourth lens unit or to use many aspherical surfaces. On the contrary, if |f4|/fw becomes larger than the upper limit of the conditional expression (3), it becomes easy to correct the aberration. However, the movement amount of the fourth lens unit in the zooming increases, and hence the entire length of the lenses increases.

More preferably, the numerical range of the conditional expression (3) should be set as follows.

$$3.5 < |f4|/fw < 10 \tag{3a}$$

Further, it is preferable to satisfy the conditional expression (3b). Thus, it becomes easy to correct aberration of the fourth lens unit, and it is possible to reduce the movement amount in the zooming.

$$4.0 < |f4|/fw < 8.0 \tag{3b}$$

The conditional expression (4) relates to an optical power of the second lens unit.

If |f2|/fw becomes smaller than the lower limit of the conditional expression (4), the optical power of the second lens unit becomes too strong, and hence aberration may frequently occur in the second lens unit B2. In particular, field curvature may occur largely. In order to correct such aberration appropriately, it is necessary to increase the number of lenses of the second lens unit or to use many aspherical surfaces. On the contrary, if |f2|/fw becomes greater than the upper limit of the conditional expression (4), it becomes easy to correct the aberration. However, the movement amount of the second lens unit in the zooming increases, whereby the entire length of the lenses increases and the front lens diameter increases.

More preferably, the numerical range of the conditional expression (4) should be set as follows.

$$0.9 < |f2|/fw < 4.0 \tag{4a}$$

Further, it is preferable to satisfy the conditional expression (4b). Thus, it becomes easy to correct aberration of the second lens unit, and to downsize the entire system.

$$1.5 < |f2|/fw < 4.0 \tag{4b}$$

The conditional expression (5) relates to a magnification action of the second lens unit B2. If |β2T/β2W| becomes smaller than the lower limit of the conditional expression (5), the magnification action of the second lens unit is weakened. Therefore, it is necessary to increase the power of the fourth lens unit in order to obtain a predetermined zoom ratio. Then, the variation of the image plane in the zooming increases and becomes difficult to be suppressed. In addition, if |β2T/β2W| becomes larger than the upper limit, it becomes easy to downsize the entire system and to decrease the front lens diameter. However, it is not preferable because the field curvature and the astigmatism increase.

More preferably, the numerical range of the conditional expression (5) should be set as follows.

$$59 < |\beta2T/\beta2W| < 210 \tag{5a}$$

Here, it is described in a numerical manner that the second lens unit B2 in each embodiment is the principal magnification lens unit.

The lateral magnifications at the wide-angle end and at the telephoto end of the i-th lens unit (i=1, 2, 3 . . . ) are denoted by βiw and βiT, respectively. In this case, a ratio β2T/β2W of the lateral magnification in the second lens unit B2 is larger than a ratio βiT/βiW of another arbitrary i-th lens unit.

In other words, the following expression is satisfied.

$$1 \leq \frac{|\beta2T/\beta2W|}{|\beta iT/\beta iW|}$$

Note that it is preferable to set in each embodiment so that the following expression is satisfied.

$$1 < \frac{|\beta2T/\beta2W|}{|\beta4T/\beta4W|} < 1100 \tag{Equation 2}$$

Now, the description of the zoom lens systems of the individual embodiments is made again.

In Embodiments 1 and 5, the aperture stop SP is fixed with respect to the image plane in the zooming. Therefore, it is not necessary to dispose an actuator for moving the aperture stop SP in the zooming, and hence a simple structure can be realized. In addition, compared with a structure in which the aperture stop SP is moved integrally with the third lens unit B3, it is easy to downsize and lighten the third lens unit B3.

Further, if the number of movable lens units is controlled to be three in the entire system by fixing the first lens unit B1 and the third lens unit B3 in the zooming, it is possible to eliminate a variation in entire length of the lenses in the zooming.

In addition, the zooming can be performed as described in Embodiments 1 and 2, in which a set of the second lens unit B2 and the fifth lens unit B5 is used for the zooming from the wide-angle end to a predetermined zoom position, and a set of the fourth lens unit B4 and the fifth lens unit B5 is used for the zooming from the predetermined zoom position to the telephoto end. Thus, the number of movable lens units in each zoom range becomes a minimum, two. Therefore, the number of movable lens units can be controlled to be three in the entire system while a high zoom ratio can be realized easily by a so-called double zoom method.

As described above, according to the individual embodiments, the magnification sharing can be set appropriately by the structures of the lens units and a power arrangement, and hence the zoom lens system having a high zoom ratio and high imaging performance can be obtained.

In addition, according to the individual embodiments, a new zoom method is adopted, and hence the zoom lens system having a high zoom ratio and a small entire system can be obtained.

Next, a structure of lenses in each lens unit is described.

In each embodiment, the first lens unit B1 includes a cemented lens of a negative lens and a positive lens, and two positive lenses having a convex surface on the object side.

The second lens unit B2 includes at least two negative lenses and one positive lens.

Note that the second lens unit B2 preferably includes at least a negative lens having a meniscus shape with a convex surface on the object side, a negative lens, and a positive lens. In addition, it is preferable to use an aspherical surface.

According to this structure, it is easy to decrease the front lens diameter and to reduce a variation in lateral chromatic aberration due to the zooming.

Specifically, in each embodiment, the second lens unit B2 includes a negative lens having a meniscus shape with a convex surface on the object side, a biconcave negative lens, and a cemented lens of a biconvex positive lens and a biconcave negative lens.

The third lens unit B3 includes a single biconvex positive lens. Further, in each embodiment, the third lens unit B3 is moved in the direction having a component perpendicular to the optical axis (direction perpendicular to the optical axis in each embodiment), and hence a position of the image is varied in the direction perpendicular to the optical axis.

Thus, blurring of the image due to shaking or the like is corrected. In other words, image stabilization is performed.

Note that the third lens unit B3 may include multiple lenses. In this case, the entire or a part of the third lens unit B3 may be moved in the direction having a component perpendicular to the optical axis so as to correct blurring of the image (due to shaking).

The fourth lens unit B4 in each of Embodiments 1 to 4 includes a cemented lens of a negative lens and a positive lens. The fourth lens unit B4 in Embodiment 5 includes a negative lens, a positive lens, and a cemented lens of a negative lens and a positive lens.

The fifth lens unit B5 includes a biconvex positive lens and a cemented lens of a negative lens and a positive lens.

As described above, in each embodiment, it is possible to provide the zoom lens system that has a high zoom ratio and high performance, and can be used for a digital camera, a video camera or the like, in which various aberrations can be corrected appropriately.

Next, an embodiment of a digital still camera using the zoom lens system of the present invention as the shooting optical system is described with reference to FIG. 37.

In FIG. 37, a camera main body 20, and a shooting optical system 21 including any one of the zoom lens systems described in Embodiments 1 to 5 are provided.

A solid-state image pickup element 22 such as a CCD sensor or a CMOS sensor is incorporated in the camera main body, and receives light of an object image formed by the shooting optical system 21. A memory 23 records information corresponding to the object image photoelectrically converted by the solid-state image pickup element 22.

A finder 24 includes a liquid crystal display panel, and is used for observing the object image formed on the solid-state image pickup element 22.

Next, an embodiment of a video camera using the zoom lens system of the present invention as the shooting optical system is described with reference to FIG. 38.

In FIG. 38, a video camera main body 10, and a shooting optical system 11 including any one of the zoom lens systems described in Embodiments 1 to 5 are provided.

A solid-state image pickup element 12 such as a CCD sensor or a CMOS sensor is incorporated in the video camera main body, and receives light of an object image formed by the shooting optical system 11. A memory 13 records information corresponding to the object image photoelectrically converted by the solid-state image pickup element 12.

A finder 14 is used for observing the object image displayed on a display device (not shown).

The display device includes a liquid crystal display panel, on which the object image formed on the solid-state image pickup element 12 is displayed.

In this way, the zoom lens system of the present invention is applied to a camera such as a digital still camera or a video camera, and hence a compact camera having high optical performance can be realized.

Hereinafter, Numerical Embodiments 1 to 5 corresponding to Embodiments 1 to 5 are described. In the numerical embodiment, r denotes a radius of curvature. Further, d denotes a lens thickness or an air interval between the i-th lens and (i+1)th lens from the object side, and nd and vd respectively denote a refractive index of an i-th optical member from the object side with respect to a d-line and an Abbe number with respect to the d-line. The Abbe number vd is expressed by the equation below.

$$vd=(Nd-1)/(NF-NC)$$

Here, Nd denotes a refractive index with respect to the d-line (at wavelength of 587.56 nm), NF denotes a refractive index with respect to an F-line (at wavelength of 486.13 nm), NC denotes a refractive index with respect to a C-line (at wavelength of 656.27 nm), and BF denotes a back focus that is obtained by air conversion of a distance from the last surface of the lens to a paraxial image plane. The entire length of the lenses is a distance between the frontmost surface and the rearmost surface of the lens plus the back focus BF.

In addition, relationships between each of the conditional expressions described above and each of Embodiments 1 to 5 are shown in Tables 1 to 5, respectively.

The shape of the aspherical surface is expressed by the following equation, where the X axis corresponds to the optical axis direction, the H axis corresponds to the direction perpendicular to the optical axis, the propagation direction of light is a positive direction, R denotes a paraxial radius of curvature, k denotes a conic constant, and $A_4, A_6, A_8$ and $A_{10}$ denote aspherical surface coefficients.

$$X = \frac{\frac{H^2}{R}}{1 + \sqrt{1 - (1+k)\left(\frac{H}{R}\right)^2}} + A_4 H^4 + A_6 H^6 + A_8 H^8 + A_{10} H^{10}$$

The sign "*" affixed to the surface number indicates that the surface has an aspherical surface shape. The sign "e-x" in the aspherical surface coefficient indicates "×10⁻ˣ".

The last two surfaces in each numerical embodiment indicate surfaces constituting the optical block G.

Numerical Embodiment 1 unit: mm surface data

| surface number | r | d | nd | vd |
|---|---|---|---|---|
| 1 | 66.115 | 1.60 | 1.80518 | 25.4 |
| 2 | 28.183 | 5.51 | 1.48749 | 70.2 |
| 3 | −319.832 | 0.15 | | |
| 4 | 28.377 | 3.59 | 1.61800 | 63.3 |
| 5 | 235.037 | 0.15 | | |
| 6 | 25.819 | 1.94 | 1.65160 | 58.5 |
| 7 | 42.915 | (variable) | | |
| 8 | 33.928 | 0.60 | 1.88300 | 40.8 |
| 9 | 6.347 | 2.30 | | |
| 10 | −10.901 | 0.50 | 1.81600 | 46.6 |
| 11 | 7.451 | 0.55 | | |
| 12 | 8.613 | 2.10 | 1.84666 | 23.9 |
| 13 | −20.048 | 0.50 | 1.77250 | 49.6 |
| 14 | 25.633 | (variable) | | |
| 15 (stop) | ∞ | 0.80 | | |
| 16 | 14.709 | 1.76 | 1.48749 | 70.2 |
| 17 | −10.650 | (variable) | | |
| 18 | −8.077 | 0.50 | 1.88300 | 40.8 |
| 19 | 21.609 | 1.42 | 1.84666 | 23.9 |
| 20 | −22.197 | (variable) | | |
| 21* | 14.876 | 1.70 | 1.58313 | 59.4 |
| 22 | −17.012 | 0.15 | | |
| 23 | −45.154 | 0.50 | 1.92286 | 18.9 |
| 24 | 17.344 | 1.86 | 1.80400 | 46.6 |
| 25 | −13.466 | (variable) | | |
| 26 | ∞ | 1.00 | 1.51633 | 64.1 |
| 27 | ∞ | 2.86 | | | aspherical surface data
twenty-first surface

K = −4.64973e+000  A4 = −2.06221e−004  A6 = −3.08941e−006
A8 = 1.06856e−007  A10 = 4.86653e−024 various data
zoom ratio 58.34

| | | | | | | |
|---|---|---|---|---|---|---|
| focal length | 1.96 | 8.89 | 22.96 | 70.48 | 87.89 | 114.22 |
| f-number | 1.86 | 3.48 | 4.02 | 4.50 | 4.70 | 5.04 |
| field angle | 30.44 | 7.37 | 2.87 | 0.93 | 0.75 | 0.58 |
| image height | 1.15 | 1.15 | 1.15 | 1.15 | 1.15 | 1.15 |
| entire length of lenses | 69.86 | 69.86 | 69.86 | 69.86 | 69.86 | 69.86 |
| BF | 11.14 | 13.70 | 15.10 | 9.23 | 7.60 | 4.99 |
| d7 | 0.80 | 13.82 | 18.16 | 21.97 | 21.97 | 21.97 |
| d14 | 22.51 | 9.49 | 5.15 | 1.34 | 1.34 | 1.34 |
| d17 | 0.70 | 0.70 | 0.70 | 0.70 | 3.70 | 6.70 |
| d20 | 6.20 | 3.63 | 2.23 | 8.10 | 6.69 | 6.30 |
| d25 | 7.61 | 10.18 | 11.58 | 5.71 | 4.07 | 1.46 | zoom lens system unit data

| unit | leading surface | focal length |
|---|---|---|
| 1 | 1 | 31.58 |
| 2 | 8 | −4.03 |
| 3 | 15 | 12.97 |
| 4 | 18 | −14.59 |
| 5 | 21 | 10.08 |
| 6 | 26 | ∞ |

Numerical Embodiment 2 unit: mm surface data

| surface number | r | d | nd | vd |
|---|---|---|---|---|
| 1 | 96.172 | 1.60 | 1.80518 | 25.4 |
| 2 | 33.402 | 5.43 | 1.48749 | 70.2 |
| 3 | −134.219 | 0.15 | | |
| 4 | 30.600 | 3.27 | 1.61800 | 63.3 |
| 5 | 102.208 | 0.15 | | |
| 6 | 26.644 | 3.07 | 1.61800 | 63.3 |
| 7 | 67.065 | (variable) | | |
| 8 | −147.153 | 0.50 | 1.88300 | 40.8 |
| 9 | 7.789 | 1.88 | | |
| 10 | −36.182 | 0.50 | 1.81600 | 46.6 |
| 11 | 10.294 | 0.17 | | |
| 12 | 8.114 | 2.12 | 1.84666 | 23.9 |
| 13 | −33.220 | 0.50 | 1.77250 | 49.6 |
| 14 | 10.408 | (variable) | | |
| 15 (stop) | ∞ | 0.84 | | |
| 16 | 10.639 | 1.80 | 1.48749 | 70.2 |
| 17 | −19.254 | (variable) | | |
| 18 | −9.228 | 0.50 | 1.88300 | 40.8 |
| 19 | 10.395 | 1.42 | 1.84666 | 23.9 |
| 20 | −62.190 | (variable) | | |
| 21* | 12.675 | 1.65 | 1.58313 | 59.4 |
| 22 | −21.413 | 0.15 | | |
| 23 | 52.555 | 0.55 | 1.92286 | 18.9 |
| 24 | 9.861 | 1.83 | 1.80400 | 46.6 |
| 25 | −18.727 | (variable) | | |
| 26 | ∞ | 1.00 | 1.51633 | 64.1 |
| 27 | ∞ | 3.07 | | | aspherical surface data
twenty-first surface

K = −2.67498e+000  A4 = −2.33040e−004  A6 = 8.19444e−006
A8 = −7.93464e−007  A10 = 2.77343e−008 various data
zoom ratio 55.29

| | | | | | | |
|---|---|---|---|---|---|---|
| focal length | 2.08 | 8.86 | 19.67 | 62.37 | 81.92 | 113.21 |
| f-number | 1.85 | 2.05 | 2.17 | 2.60 | 2.96 | 4.00 |
| field angle | 30.03 | 7.71 | 3.49 | 1.10 | 0.83 | 0.60 |
| image height | 1.20 | 1.20 | 1.20 | 1.20 | 1.20 | 1.20 |
| entire length of lenses | 70.23 | 70.23 | 70.23 | 70.23 | 70.23 | 70.23 |
| BF | 10.79 | 12.68 | 13.55 | 8.42 | 6.98 | 4.35 |
| d7 | 1.20 | 14.13 | 18.03 | 22.23 | 22.23 | 22.23 |
| d14 | 22.37 | 7.53 | 4.11 | 1.34 | 1.34 | 1.34 |
| d17 | 0.80 | 0.80 | 0.80 | 0.80 | 3.80 | 6.80 |
| d20 | 6.65 | 6.66 | 5.32 | 9.01 | 7.45 | 7.08 |
| d25 | 7.06 | 8.95 | 9.82 | 4.69 | 3.25 | 0.63 |

-continued unit: mm zoom lens system unit data

| unit | leading surface | focal length |
|---|---|---|
| 1 | 1 | 32.41 |
| 2 | 8 | −4.61 |
| 3 | 15 | 14.34 |
| 4 | 18 | −11.87 |
| 5 | 21 | 8.82 |
| 6 | 26 | ∞ |

Numerical Embodiment 3 unit: mm surface data

| surface number | r | d | nd | vd |
|---|---|---|---|---|
| 1 | 83.025 | 1.60 | 1.80518 | 25.4 |
| 2 | 30.779 | 5.53 | 1.48749 | 70.2 |
| 3 | −150.375 | 0.15 | | |
| 4 | 27.824 | 2.90 | 1.61800 | 63.3 |
| 5 | 84.099 | 0.15 | | |
| 6 | 22.846 | 2.55 | 1.61800 | 63.3 |
| 7 | 49.588 | (variable) | | |
| 8 | 66.390 | 0.50 | 1.88300 | 40.8 |
| 9 | 4.035 | 2.99 | | |
| 10 | −17.905 | 0.50 | 1.88300 | 40.8 |
| 11 | 13.179 | 0.20 | | |
| 12 | 7.954 | 3.16 | 1.84666 | 23.9 |
| 13 | −15.128 | 0.50 | 1.77250 | 49.6 |
| 14 | 22.207 | (variable) | | |
| 15 (stop) | ∞ | 0.84 | | |
| 16* | 17.207 | 1.80 | 1.48749 | 70.2 |
| 17 | −8.993 | (variable) | | |
| 18 | −8.764 | 0.50 | 1.88300 | 40.8 |
| 19 | 45.388 | 1.42 | 1.69895 | 30.1 |
| 20 | −15.182 | (variable) | | |
| 21* | 17.307 | 1.49 | 1.58313 | 59.4 |
| 22 | −25.952 | 0.15 | | |
| 23 | −291.844 | 0.55 | 1.92286 | 18.9 |
| 24 | 15.514 | 1.60 | 1.80400 | 46.6 |
| 25 | −16.842 | (variable) | | |
| 26 | ∞ | 1.00 | 1.51633 | 64.1 |
| 27 | ∞ | 2.89 | | | aspherical surface data sixteenth surface

K = −3.42823e−001  A4 = −1.59577e−004  A6 = −4.47471e−006 twenty-first surface

K = −1.84301e+000  A4 = −1.63243e−004  A6 = 3.50620e−006
A8 = −5.47030e−007  A10 = 3.03881e−008 various data
zoom ratio 58.32

| | | | | | |
|---|---|---|---|---|---|
| focal length | 1.86 | 10.51 | 26.17 | 56.27 | 108.42 |
| f-number | 1.85 | 2.47 | 2.81 | 2.59 | 5.00 |
| field angle | 32.84 | 6.51 | 2.63 | 1.22 | 0.63 |
| image height | 1.20 | 1.20 | 1.20 | 1.20 | 1.20 |
| entire length of lenses | 71.06 | 71.06 | 71.06 | 71.06 | 71.06 |
| BF | 10.61 | 14.59 | 16.58 | 12.29 | 5.94 |
| d7 | 1.20 | 14.26 | 18.19 | 21.38 | 22.44 |
| d14 | 22.37 | 5.95 | 2.85 | 1.38 | 1.13 |
| d17 | 0.80 | 2.59 | 3.00 | 2.96 | 2.84 |
| d20 | 6.65 | 4.24 | 1.01 | 3.62 | 9.27 |
| d25 | 7.06 | 11.04 | 13.03 | 8.74 | 2.39 |

-continued unit: mm zoom lens system unit data

| unit | leading surface | focal length |
|---|---|---|
| 1 | 1 | 30.84 |
| 2 | 8 | −3.64 |
| 3 | 15 | 12.39 |
| 4 | 8 | −18.66 |
| 5 | 21 | 11.32 |
| 6 | 26 | ∞ |

Numerical Embodiment 4 unit: mm surface data

| surface number | r | d | nd | vd |
|---|---|---|---|---|
| 1 | 100.285 | 1.60 | 1.80610 | 33.3 |
| 2 | 25.643 | 6.16 | 1.49700 | 81.5 |
| 3 | −153.236 | 0.15 | | |
| 4 | 27.371 | 2.86 | 1.61800 | 63.3 |
| 5 | 82.833 | 0.15 | | |
| 6 | 23.411 | 2.51 | 1.61800 | 63.3 |
| 7 | 67.351 | (variable) | | |
| 8 | 34.412 | 0.50 | 1.88300 | 40.8 |
| 9 | 3.914 | 3.20 | | |
| 10 | −17.522 | 0.50 | 1.87273 | 25.5 |
| 11 | 14.013 | 0.20 | | |
| 12 | 8.147 | 3.52 | 1.84666 | 23.9 |
| 13 | −7.773 | 0.50 | 1.77250 | 49.6 |
| 14 | 22.150 | (variable) | | |
| 15 (stop) | ∞ | 0.84 | | |
| 16* | 17.984 | 1.80 | 1.48749 | 70.2 |
| 17 | −8.568 | (variable) | | |
| 18 | −8.138 | 0.50 | 1.88300 | 40.8 |
| 19 | 24.750 | 1.42 | 1.68553 | 29.7 |
| 20 | −15.648 | (variable) | | |
| 21* | 14.366 | 1.58 | 1.58313 | 59.4 |
| 22 | −22.475 | 0.15 | | |
| 23 | −556.537 | 0.55 | 1.92286 | 18.9 |
| 24 | 15.256 | 1.60 | 1.80295 | 47.2 |
| 25 | −17.136 | (variable) | | |
| 26 | ∞ | 1.00 | 1.51633 | 64.1 |
| 27 | ∞ | 2.88 | | | aspherical surface data sixteenth surface

K = −4.76082e−001  A4 = −1.56211e−004  A6 = −4.12033e−006 twenty-first surface

K = −2.02715e+000  A4 = −1.74932e−004  A6 = 5.66784e−006
A8 = −7.54320e−007  A10 = 3.31401e−008 various data
zoom ratio 57.57

| | | | | | |
|---|---|---|---|---|---|
| focal length | 1.80 | 5.24 | 18.92 | 40.79 | 103.61 |
| f-number | 1.85 | 2.15 | 2.63 | 2.19 | 5.00 |
| field angle | 33.69 | 12.89 | 3.63 | 1.68 | 0.66 |
| image height | 1.20 | 1.20 | 1.20 | 1.20 | 1.20 |
| entire length of lenses | 70.83 | 70.05 | 71.31 | 72.68 | 73.38 |
| BF | 10.60 | 12.59 | 15.38 | 12.49 | 5.93 |
| d7 | 1.20 | 10.30 | 17.88 | 21.81 | 23.51 |
| d14 | 20.95 | 8.70 | 3.05 | 1.60 | 1.19 |
| d17 | 0.80 | 2.24 | 2.35 | 1.61 | 1.16 |
| d20 | 6.65 | 5.59 | 2.01 | 4.53 | 10.95 |
| d25 | 7.06 | 9.05 | 11.84 | 8.95 | 2.39 |

-continued unit: mm zoom lens system unit data

| unit | leading surface | focal length |
|---|---|---|
| 1 | 1 | 31.12 |
| 2 | 8 | −3.89 |
| 3 | 15 | 12.17 |
| 4 | 18 | −14.86 |
| 5 | 21 | 10.22 |
| 6 | 26 | ∞ |

Numerical Embodiment 5 unit: mm surface data

| surface number | r | d | nd | vd |
|---|---|---|---|---|
| 1 | 62.500 | 1.60 | 1.80518 | 25.4 |
| 2 | 27.020 | 4.61 | 1.51633 | 64.1 |
| 3 | 183.420 | 0.15 | | |
| 4 | 38.243 | 3.29 | 1.49700 | 81.5 |
| 5 | 2275.767 | 0.15 | | |
| 6 | 22.490 | 2.77 | 1.71300 | 53.9 |
| 7 | 59.281 | (variable) | | |
| 8 | 358.926 | 0.50 | 1.88300 | 40.8 |
| 9 | 4.970 | 2.34 | | |
| 10 | −27.256 | 0.50 | 1.83481 | 42.7 |
| 11 | 14.356 | 0.17 | | |
| 12 | 7.480 | 2.05 | 1.84666 | 23.9 |
| 13 | −27.961 | 0.50 | 1.66020 | 57.8 |
| 14 | 8.731 | (variable) | | |
| 15 (stop) | ∞ | 0.84 | | |
| 16 | 9.667 | 2.22 | 1.58313 | 59.4 |
| 17 | −13.969 | (variable) | | |
| 18 | −105.010 | 0.50 | 1.67252 | 40.7 |
| 19 | 18.542 | 0.48 | | |
| 20 | 119.639 | 1.13 | 1.67270 | 32.1 |
| 21 | −29.871 | 0.50 | 1.88300 | 40.8 |
| 22 | −6.120 | 0.50 | 1.84666 | 23.9 |
| 23 | −20.641 | 1.42 | | |
| 24 | −17.875 | (variable) | | |
| 25* | 14.516 | 1.61 | 1.58313 | 59.4 |
| 26 | −18.286 | 0.15 | | |
| 27 | 89.345 | 0.55 | 1.84666 | 23.9 |
| 28 | 9.217 | 1.91 | 1.73915 | 53.2 |
| 29 | −15.047 | (variable) | | |
| 30 | ∞ | 1.00 | 1.51633 | 64.1 |
| 31 | ∞ | 4.07 | | | aspherical surface data
twenty-fifth surface

K = −4.19518e+000   A4 = −2.20815e−004   A6 = −1.64316e−006
A8 = 1.31814e−007   A10 = −1.65375e−009 various data
zoom ratio 39.61

| focal length | 1.99 | 8.92 | 21.58 | 78.94 |
|---|---|---|---|---|
| f-number | 1.85 | 2.23 | 2.65 | 3.63 |
| field angle | 31.05 | 7.66 | 3.18 | 0.87 |
| image height | 1.20 | 1.20 | 1.20 | 1.20 |
| entire length of lenses | 71.29 | 71.29 | 71.29 | 71.29 |
| BF | 9.64 | 12.34 | 14.09 | 7.52 |
| d7 | 1.20 | 14.33 | 18.28 | 22.55 |
| d14 | 22.58 | 9.45 | 5.50 | 1.23 |
| d17 | 0.84 | 1.07 | 1.14 | 1.22 |
| d24 | 6.23 | 3.30 | 1.48 | 7.97 |
| d29 | 4.91 | 7.61 | 9.36 | 2.80 | zoom lens system unit data

| unit | leading surface | focal length |
|---|---|---|
| 1 | 1 | 31.58 |
| 2 | 8 | −4.01 |
| 3 | 15 | 10.15 |
| 4 | 18 | −9.47 |
| 5 | 25 | 9.04 |
| 6 | 30 | ∞ |

TABLE 1

Corresponding value of conditional expression of Embodiment 1

| | Wide-angle end | Intermediate point 1 | Intermediate point 2 | Intermediate point 3 | Intermediate point 4 | Telephoto end |
|---|---|---|---|---|---|---|
| f | 1.96 | 8.89 | 22.96 | 70.48 | 87.89 | 114.22 |
| β2 | −0.19 | −0.48 | −0.99 | −15.07 | −15.07 | −15.07 |
| β3 | −0.68 | −1.82 | −2.68 | −0.22 | −0.22 | −0.22 |
| β4 | −2.21 | −0.68 | −0.45 | −22.42 | 6.21 | 2.73 |
| β5 | −0.22 | −0.47 | −0.61 | −0.03 | 0.13 | 0.39 |
| β4 × β5 | 0.48 | 0.32 | 0.27 | 0.66 | 0.82 | 1.07 |
| max|β4 × β5|/min|β4 × β5| | | | 3.96 | | | |
| st2/fw | | | 10.82 | | | |
| |f4|/fw | | | 7.45 | | | |
| |f2|/fw | | | 2.06 | | | |
| |β2T/β2w| | | 79.32 | | | |
| |β3T/β3w| | | 0.32 | | | |
| |β4T/β4w| | | 1.24 | | | |
| |β5T/β5w| | | 1.77 | | | |
| (|β2T/β2w|)/(|β4T/β4w|) | | | 64.21 | | | |

TABLE 2

Corresponding value of conditional expression of Embodiment 2

|  | Wide-angle end | Intermediate point 1 | Intermediate point 2 | Intermediate point 3 | Intermediate point 4 | Telephoto end |
| --- | --- | --- | --- | --- | --- | --- |
| F | 2.08 | 8.86 | 19.67 | 62.37 | 81.92 | 113.21 |
| β2 | −0.22 | −0.56 | −1.06 | −35.97 | −35.97 | −35.97 |
| β3 | −0.84 | −3.76 | −5.27 | −0.09 | −0.09 | −0.09 |
| β4 | −0.91 | −0.22 | −0.15 | −5.13 | 17.26 | 3.22 |
| β5 | −0.39 | −0.60 | −0.70 | −0.12 | 0.05 | 0.34 |
| β4 × β5 | 0.35 | 0.13 | 0.11 | 0.60 | 0.79 | 1.11 |
| max\|β4 × β5\|/min\|β4 × β5\| | | | 10.09 | | | |
| st2/fw | | | 10.13 | | | |
| \|f4\|/fw | | | 5.72 | | | |
| \|f2\|/fw | | | 2.22 | | | |
| \|β2T/β2w\| | | | 163.50 | | | |
| \|β3T/β3w\| | | | 0.11 | | | |
| \|β4T/β4w\| | | | 3.54 | | | |
| \|β5T/β5w\| | | | 0.87 | | | |
| (\|β2T/β2w\|)/(\|β4T/β4w\|) | | | 46.21 | | | |

TABLE 3

Corresponding value of conditional expression of Embodiment 3

|  | Wide-angle end | Intermediate point 1 | Intermediate point 2 | Intermediate point 3 | Telephoto end |
| --- | --- | --- | --- | --- | --- |
| F | 1.86 | 10.51 | 26.17 | 56.27 | 108.42 |
| β2 | −0.17 | −0.44 | −0.83 | −3.04 | −26.61 |
| β3 | −0.61 | −2.62 | −4.04 | −1.29 | −0.13 |
| β4 | −17.73 | −0.77 | −0.45 | −2.58 | 2.67 |
| β5 | −0.03 | −0.38 | −0.56 | −0.18 | 0.38 |
| β4 × β5 | 0.58 | 0.30 | 0.25 | 0.47 | 1.01 |
| max\|β4 × β5\|/min\|β4 × β5\| | | 4.04 | | | |
| st2/fw | | 11.43 | | | |
| \|f4\|/fw | | 10.04 | | | |
| \|f2\|/fw | | 1.96 | | | |
| \|β2T/β2w\| | | 156.53 | | | |
| \|β3T/β3w\| | | 0.21 | | | |
| \|β4T/β4w\| | | 0.15 | | | |
| \|β5T/β5w\| | | 12.67 | | | |
| (\|β2T/β2w\|)/(\|β4T/β4w\|) | | 1039.43 | | | |

TABLE 4

Corresponding value of conditional expression of Embodiment 4

|  | Wide-angle end | Intermediate point 1 | Intermediate point 2 | Intermediate point 3 | Telephoto end |
| --- | --- | --- | --- | --- | --- |
| f | 1.80 | 5.24 | 18.92 | 40.79 | 103.61 |
| β2 | −0.17 | −0.30 | −0.70 | −2.39 | 59.23 |
| β3 | −0.62 | −1.53 | −3.14 | −1.36 | 0.05 |
| β4 | −3.44 | −1.06 | −0.44 | −1.19 | 3.55 |
| β5 | −0.16 | −0.35 | −0.62 | −0.34 | 0.30 |
| β4 × β5 | 0.54 | 0.37 | 0.28 | 0.41 | 1.07 |
| max\|β4 × β5\|/min\|β4 × β5\| | | 3.82 | | | |
| st2/fw | | 10.98 | | | |
| \|f4\|/fw | | 8.25 | | | |
| \|f2\|/fw | | 1.95 | | | |
| \|β2T/β2w\| | | 348.41 | | | |
| \|β3T/β3w\| | | 0.08 | | | |
| \|β4T/β4w\| | | 1.03 | | | |
| \|β5T/β5w\| | | 1.88 | | | |
| (\|β2T/β2w\|)/(\|β4T/β4w\|) | | 337.62 | | | |

TABLE 5

Corresponding value of conditional expression of Embodiment 5

| | Wide-angle end | Intermediate point 1 | Intermediate point 2 | Telephoto end |
|---|---|---|---|---|
| f | 1.99 | 8.92 | 21.58 | 78.94 |
| β2 | −0.19 | −0.47 | −0.87 | −12.07 |
| β3 | −0.47 | −1.07 | −1.43 | −0.21 |
| β4 | −3.31 | −1.08 | −0.77 | 59.01 |
| β5 | −0.22 | −0.52 | −0.71 | 0.02 |
| β4 × β5 | 0.72 | 0.56 | 0.55 | 0.97 |
| max\|β4 × β5\|/min\|β4 × β5\| | | 1.76 | | |
| st2/fw | | 10.71 | | |
| \|f4\|/fw | | 4.75 | | |
| \|f2\|/fw | | 2.01 | | |
| \|β2T/β2w\| | | 63.53 | | |
| \|β3T/β3w\| | | 0.45 | | |
| \|β4T/β4w\| | | 17.83 | | |
| \|β5T/β5w\| | | 0.09 | | |
| (\|β2T/β2w\|)/(\|β4T/β4w\|) | | 3.56 | | |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-099206, filed Apr. 7, 2008, which is hereby incorporated by reference herein in its entirety.

The invention claimed is:

1. A zoom lens system, comprising, in order from an object side to an image side:
a first lens unit which has a positive optical power and does not move for zooming;
a second lens unit having a negative optical power;
a third lens unit having a positive optical power;
a fourth lens unit having a negative optical power; and
a fifth lens unit which has a positive optical power and moves along a locus convex to the object side for zooming,
wherein the second lens unit has a largest ratio of an imaging magnification at a telephoto end to an imaging magnification at a wide-angle end among lens units included in the zoom lens system; and
wherein the following condition is satisfied $$1.4 < \max|\beta 4 \times \beta 5|/\min|\beta 4 \times \beta 5| < 14,$$

where $\max|\beta 4 \times \beta 5|$ denotes a maximum value of a product of a lateral magnification of the fourth lens unit and a lateral magnification of the fifth lens unit in zooming from the wide-angle end to the telephoto end, and $\min|\beta 4 \times \beta 5|$ denotes a minimum value of a product of the lateral magnification of the fourth lens unit and the lateral magnification of the fifth lens unit in zooming from the wide-angle end to the telephoto end.

2. A zoom lens system according to claim 1, wherein the following condition is satisfied $$3.0 < |f4|/fw < 12,$$

where f4 denotes a focal length of the fourth lens unit and fw denotes a focal length of the zoom lens system at the wide-angle end.

3. A zoom lens system according to claim 1, wherein the following condition is satisfied $$0.82 < |f2|/fw < 5.0,$$

where f2 denotes a focal length of the second lens unit and fw denotes a focal length of the zoom lens system at the wide-angle end.

4. A zoom lens system according to claim 1, wherein the following condition is satisfied $$39 < |\beta 2T/\beta 2W| < 350,$$

where β2W and β2T denote lateral magnifications at the wide-angle end and at the telephoto end of the second lens unit, respectively.

5. A camera, comprising:
the zoom lens system according to claim 1; and
a solid-state image pickup element for receiving light of an image formed by the zoom lens system.

6. A zoom lens system, comprising, in order from an object side to an image side:
a first lens unit having a positive optical power;
a second lens unit having a negative optical power;
a third lens unit having a positive optical power;
a fourth lens unit having a negative optical power; and
a fifth lens unit which has a positive optical power and moves along a locus convex to the object side for zooming,
wherein the second lens unit has a largest ratio of an imaging magnification at a telephoto end to an imaging magnification at a wide-angle end among lens units included in the zoom lens system; and
wherein the following conditions are satisfied:

$$1.4 < \max|\beta 4 \times \beta 5|/\min|\beta 4 \times \beta 5| < 14; \text{ and}$$

$$0.4 < st2/fw < 20,$$

where $\max|\beta 4 \times \beta 5|$ denotes a maximum value of a product of a lateral magnification of the fourth lens unit and a lateral magnification of the fifth lens unit in zooming from the wide-angle end to the telephoto end, $\min|\beta 4 \times \beta 5|$ denotes a minimum value of a product of the lateral magnification of the fourth lens unit and the lateral magnification of the fifth lens unit in zooming from the wide-angle end to the telephoto end, st2 denotes a movement amount of the second lens unit in zooming from the wide-angle end to the telephoto end, and fw denotes a focal length of the zoom lens system at the wide-angle end.

7. A zoom lens system according to claim 6, wherein the following condition is satisfied $$3.0 < |f4|/fw < 12,$$

where f4 denotes a focal length of the fourth lens unit.

8. A zoom lens system according to claim 6, wherein the following condition is satisfied $$0.82 < |f2|/fw < 5.0,$$

where f2 denotes a focal length of the second lens unit.

9. A zoom lens system according to claim 6, wherein the following condition is satisfied $$39 < |\beta 2T/\beta 2W| < 350,$$

where β2W and β2T denote lateral magnifications at the wide-angle end and at the telephoto end of the second lens unit, respectively.

10. A camera, comprising:
the zoom lens system according to claim 6; and
a solid-state image pickup element for receiving light of an image formed by the zoom lens system.

* * * * *